(12) United States Patent
Fujimoto et al.

(10) Patent No.: US 7,894,048 B2
(45) Date of Patent: Feb. 22, 2011

(54) OPTICAL SHEET AND METHOD FOR MANUFACTURING THE SAME

(75) Inventors: Shinji Fujimoto, Shizuoka (JP); Junichi Fujimori, Shizuoka (JP); Tomohiro Mizuno, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 406 days.

(21) Appl. No.: 12/017,776

(22) Filed: Jan. 22, 2008

(65) Prior Publication Data
US 2009/0066935 A1 Mar. 12, 2009

(30) Foreign Application Priority Data
Jan. 22, 2007 (JP) .............. 2007-011386

(51) Int. Cl.
*G01N 21/00* (2006.01)
(52) U.S. Cl. ..................................... 356/73
(58) Field of Classification Search ............. 356/72–73, 356/300
See application file for complete search history.

(56) References Cited

U.S. PATENT DOCUMENTS

2004/0227939 A1* 11/2004 Granger ...................... 356/326
2004/0241556 A1* 12/2004 Bellman et al. ................. 430/5
2009/0059128 A1* 3/2009 Han et al. ..................... 349/65

FOREIGN PATENT DOCUMENTS

| JP | 2006-79040 A | 3/2006 |
| JP | 2006-119166 A | 5/2006 |

* cited by examiner

*Primary Examiner*—Tarifur Chowdhury
*Assistant Examiner*—Abdullahi Nur
(74) *Attorney, Agent, or Firm*—Sughrue Mion, PLLC

(57) ABSTRACT

The present invention provides an optical sheet that excels in a light convergence function or a light diffusion function, has excellent brightness increase ratio in the desired angular direction, in particular the front surface direction, and greatly inhibits the side lobe, and a method for manufacturing such an optical sheet with good efficiency and high accuracy. The optical sheet has a substrate that has a first surface having formed thereon a peak-valley portion that converges and scatters light and an optical adjustment portion that differs in an optical property from the substrate. A plurality of the optical adjustment portions are formed at least in part of a non-passage portion for the light in the substrate in the case where a parallel beam falls from the first surface in a direction normal to a surface located opposite the first surface.

12 Claims, 21 Drawing Sheets

OPTICAL SHEET AND METHOD FOR MANUFACTURING THE SAME

BACKGROUND OF THE INVENTION

1. Field of the Invention

The present invention relates to an optical sheet that is used in displays and display devices such as liquid crystal display devices and illumination devices and that excels in a light convergence function and a light diffusion function, and to a method for manufacturing such an optical sheet. More particularly, the present invention relates to an optical sheet in which a side lobe effect is reduced and excellent brightness increase ratio in the desired angular direction (for example, front surface direction) is obtained by effectively utilizing the incident light that can become side lobe light, and to a method for manufacturing such an optical sheet.

2. Description of the Related Art

Lens films that collect light from a light source such as a light guide plate in the front direction or diffusion sheets that diffuse the light have been used in recent years for displays such as liquid crystal display elements or organic EL displays.

For example, in a direct backlight, such as shown in FIG. 1, that is suitable for television sets and the like, the light emitted from a light source 42 falls on a converging film (optical sheet) 41, part of the incident light is refracted and transmitted by the optical film 41, whereby the propagation direction thereof is changed, and goes out in the front surface direction, and the remaining part is reflected and returned to the light source 42. The reflected light from the converging film 41 is reflected by the surfaces of the optical source 42, a diffusion plate 43, a diffusion sheet 44, and the like, and again falls on the converging film 41.

Such a configuration features a wide dispersion of brightness distribution of the light going out from the light source and a reduced brightness of the front surface. Therefore, the converging film 41 improves the directional characteristic of the light from the light source so that the brightness in the front surface direction increases.

FIG. 2 is a cross-sectional view illustrating an optical path in such converging film (optical sheet) 41. As shown in FIG. 2, when the incident light is refracted and transmitted by the converging film 41, the light is divided into a component A that is refracted in the front surface direction, a component B that is refracted in the direction of departing from the front surface, rather than in the front surface direction, and a component C that is reflected by the surface. From among these light components, the component A goes out in the front surface direction, that is, observation direction and represents the light that is actually used. The reflected component C is diffusion reflected by the surface of the diffusion sheet or the like, the angle of incidence thereof on the converging film is changed, and part thereof is converted into the component A and goes out in the front surface direction. The repetition of such reflection converts most of the component C into the component A and increases the brightness in the front surface direction of the outgoing surface.

By contrast, the component B of the light that passed through an X portion in FIG. 2 is the light (referred to hereinbelow as "side lobe light") that goes out at a wide angle outside the effective viewing angle of a liquid crystal display device or the like and is lost as an unused light that makes no contribution to the brightness increase at the front surface. As a result, the brightness is reduced and also a secondary image of a high brightness is observed at an angle that is very far from the direction normal to the screen, this image causing sense of discomfort.

In order to resolve this problem, it has been suggested to provide a reflective member that reflects the incident light that can become the side lobe light on the side opposite the prism surface of the prism sheet (converging sheet), so as to reuse the incident light that can become the side lobe light by such reflection (see Japanese Patent Application Laid-Open (JP-A) No. 2006-79040).

However, the description of the aforementioned document merely indicates that such reflective member has a size equal to or less than ⅔ of the prism pattern and is located within a free space of the prism pattern, and the position thereof in which the incident light that can become the side lobe light can be effectively reflected is not accurately specified. Therefore, there is a probability of not using effectively the incident light that can become the side lobe light. Further, no specific method for forming the reflective member is disclosed.

It has also been suggested to provide a light-shielding portion on the prism sheet in order to prevent the occurrence of the side lobe light (see JP-A No. 2006-119166). This patent document discloses a specific method for forming the light-shielding portion and describes that a light transmission portion and a light absorption portion are formed separately by a self-alignment method in which light falls from a specific direction and the presence or absence (light density increase) of optical paths through which the illumination light will pass is employed. Only a portion through which the light passes (portion with a high light density) is taken as a transmission portion, and the portion through which light does not pass (portion with a low light density) is taken as a light-shielding portion.

However, in this case, the light transmission portion and light absorption portion are not formed by illumination with light from the front surface direction, and the illumination is performed from a direction at an angle of 35° to 71° to the front surface direction (direction normal to the prism sheet). Therefore, such approach is unsuitable for attaining the object of converging the light in the front surface direction. One more problem is that because a light absorption layer of a black color is employed as the light-shielding portion, the incident light that can become the side lobe light is absorbed, effective light utilization is inhibited, and brightness cannot be increased.

Accordingly, reducing the effect of the side lobe light by providing a zone having an optical property different from that of the optical sheet in a portion through which the light does not pass in the optical sheet with the object of effectively using the incident light that can become the side lobe light can be considered.

However, when "reflection" is selected as the optical property, at certain angles of incidence, the incident light that can become the side lobe light goes out as a side lobe light, without being reflected, as shown by a component D in FIG. 2. Therefore, more effective suppression of the side lobe light is still needed.

Thus, an optical sheet that excels in a light convergence function or a light diffusion function, has excellent brightness increase ratio in the desired angular direction, in particular the front surface direction, and greatly inhibits the side lobe, and a method for manufacturing such an optical sheet with good efficiency and high accuracy have not yet been suggested, and further improvement and development thereof is presently needed.

BRIEF SUMMARY OF THE INVENTION

The present invention is created to resolve the aforementioned problems inherent to the related art and attain the below-described object. Thus, it is an object of the present invention to provide an optical sheet that excels in a light convergence function or a light diffusion function, has excellent brightness increase ratio in the desired angular direction, in particular the front surface direction, and greatly inhibits the side lobe, and a method for manufacturing such an optical sheet with good efficiency and high accuracy.

Means for attaining the object are described below. Specifically, the optical sheet of the present invention includes a substrate that has a first surface having formed thereon a peak-valley portion that converges and scatters light; and an optical adjustment portion that differs in an optical property from the substrate, wherein a plurality of the optical adjustment portions are formed in the thickness direction of the substrate at least in part of a non-passage portion for the light in the substrate in the case where a parallel beam falls from the first surface in a direction normal to a surface located opposite the first surface.

The method of the present invention for manufacturing an optical sheet is a method for manufacturing an optical sheet formed from a material that has substantially no visible light absorption ability, the optical sheet having a substrate that has a first surface having formed thereon a peak-valley portion that converges and scatters light, and an optical adjustment portion that differs in an optical property from the substrate, a plurality of the optical adjustment portions being formed in the thickness direction of the substrate at least in part of a non-passage portion for the light in the substrate in the case where a parallel beam falls from the first surface in a direction normal to a surface located opposite the first surface, the method including: forming a photosensitive layer on a second surface of the substrate, the second surface being located opposite the first surface; exposing the photosensitive layer by irradiation with a parallel beam in the direction normal to the second surface from the first surface of the substrate; forming on the substrate a first optical adjustment portion that is a non-exposed portion of the photosensitive layer and differs in an optical property from the substrate; forming a substrate layer substantially identical in an optical property to the substrate on the second surface, and forming a photosensitive layer on a third surface that is located opposite the second surface in the substrate layer; exposing the photosensitive layer by irradiation with a parallel beam in the direction normal to the second surface from the first surface of the substrate; and forming on the substrate a second optical adjustment portion that is a non-exposed portion of the photosensitive layer and differs in an optical property from the substrate.

The optical sheet of the present invention is an optical sheet formed from a material that has substantially no visible light absorption ability, this optical sheet having at least a substrate that has a first surface having formed thereon a peak-valley portion that converges and scatters light, and a plurality of optical adjustment portions that differ in an optical property from the substrate, wherein a plurality of the optical adjustment portions are formed with a predetermined spacing in the thickness direction of the substrate at least in part of a non-passage portion of the light in the substrate in the case where a parallel beam falls from the first surface in the direction normal to a surface located opposite the first surface.

Therefore, one optical adjustment portion constituting the optical adjustment portions adjusts an optical path of the incident light passing via the non-passage portion in the first surface, thereby making it possible to provide an optical sheet that utilizes effectively the incident light that can become side lobe light in the conventional configuration, excels in a light convergence function or a light diffusion function, and demonstrates excellent brightness increase ratio in the desired angular direction, in particular the front surface direction.

Further, other optical adjustment portions constituting the optical adjustment portions adjust optical paths of the incident light passing through the non-passage portion, without passing through the non-passage portion in the first surface, thereby making it possible to provide an optical sheet in which side lobe can be greatly inhibited.

The method of the present invention for manufacturing an optical sheet includes a peak-valley portion formation step of forming a peak-valley portion that converges and scatters light at least on the first surface of a substrate, a photosensitive layer formation step of forming a photosensitive layer on a surface located opposite the first surface of the substrate, an exposure step of exposing the photosensitive layer by irradiation with a parallel beam in the direction normal to the surface on the opposite side from the first surface of the substrate, and an optical adjustment portion formation step of forming on the substrate an optical adjustment portion that is a non-exposed portion of the photosensitive layer and differs in an optical property from the substrate.

Therefore, an optical sheet that utilizes effectively the incident light that can become side lobe light, excels in a light convergence function or a light diffusion function, and demonstrates excellent brightness increase ratio in the desired angular direction, in particular the front surface direction, can be manufactured with high accuracy and efficiently.

Figure 1:
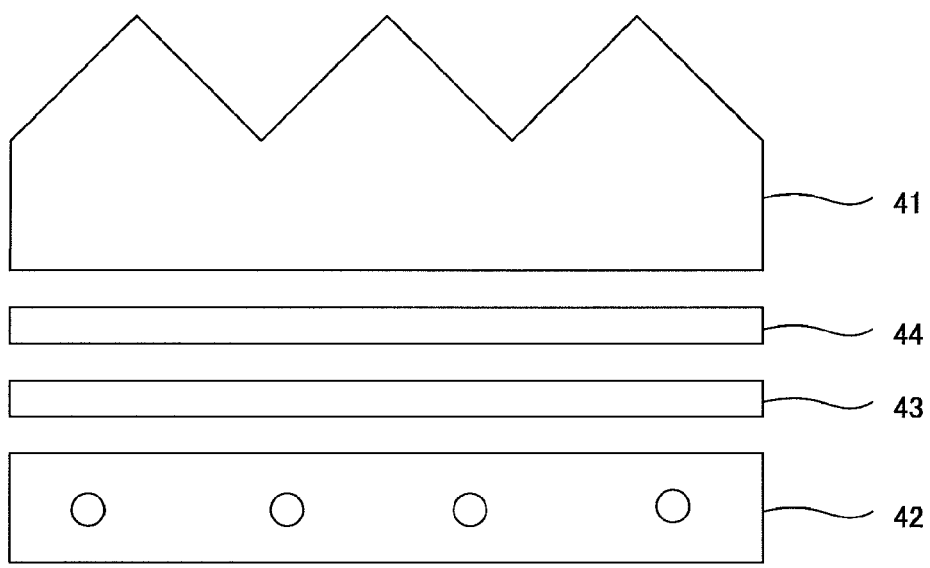
FIG. 1 is a schematic drawing illustrating an example of a liquid-crystal display device using a conventional optical sheet.
Figure 2:
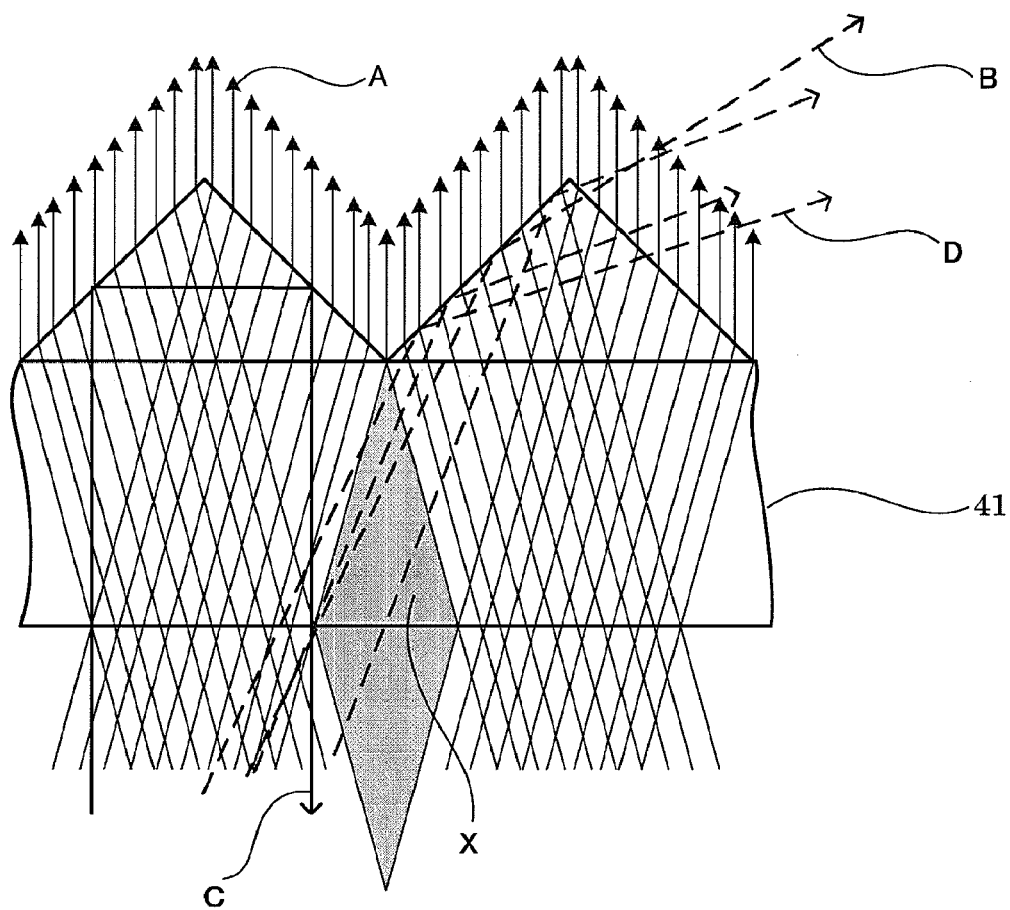
FIG. 2 is a schematic drawing illustrating an optical path of a side lobe light and the like in a conventional optical sheet (prism sheet).

DETAILED DESCRIPTION OF THE INVENTION (Optical Sheet)

The optical sheet of the present invention has at least a substrate and a light adjustment portion.

The light adjustment portion is composed of a plurality of light adjustment portions, for example, of a first light adjustment portion and a second light adjustment portion, arranged with a predetermined spacing in the thickness direction of the substrate.

The optical sheet of the present invention should have substantially no visible light absorption ability.

As used herein, the term "visible light absorption ability" means the ability to convert the absorbed light energy eventually into heat inside the optical sheet from among the light absorption following the Lambert-Beer law, and excludes materials that absorb light in a UV or IR regions; more specifically this term relates to materials with visible light absorption ability. Further, materials that have full reflection, Fresnel reflection, and metal gloss inside the optical sheet reflect light substantially without any absorption and are, therefore, excluded from those with visible light absorption ability.

The value of the visible light absorption ability is ideally is zero, but it is essentially difficult to reduce visible light absorption ability to zero. Accordingly, from the standpoint of increasing the utilization efficiency of the incident visible light it is preferred that the visible light absorption ability be made as small as possible. For this purpose, it is desirable that a material with visible light absorption ability be not used even for the light non-passage portion (any portion in which the luminous flux density decreases).

<Substrate>

The substrate has a first surface having formed thereon a peak-valley portion that converges and scatters light, and a peak-valley portion may be also formed on the surface opposite the first surface.

No specific limitation is placed on peaks and valleys and they can be appropriately selected according to the object, provided that they are fine peaks and valleys that converge and scatter light. For example, the peaks and valleys preferably have a prism structure.

No specific limitation is placed on the shape, structure, size, thickness, and material of the substrate and they can be selected appropriately according to the object. Examples of suitable shapes include a flat plate shape and sheet shape. The structure may be a monolayer structure or a laminated structure, and the size can be selected appropriately according to the size of the optical sheet. For example, the substrate can be have a rectangular, square, or round shape that can be selected appropriately according to the object, but these shapes are not limiting.

The substrate may have a monolayer structure or a multilayer structure consisting of two or more layers.

In the case of a substrate of a multilayer structure containing two or more layers, for example, the second and subsequent sheet-like substrates may be joined to the first substrate, or a coating liquid containing a photocurable resin for forming the second substrate may be coated on the surface of the first substrate, followed by exposure and curing.

No specific limitation is placed on the thickness of the substrate and it can be selected appropriately according to the object. For example, the preferred thickness is 0.005 mm to 4.0 mm. The thickness of the substrate can be measured with a film thickness meter by which the thickness of the substrate is measured by placing the substrate between the measurement probes, or by using a contactless film thickness meter that measures the thickness of the substrate by employing optical interferometry.

No specific limitation is placed on the material of the substrate and it can be selected appropriately according to the object, provided that the material is transparent, has substantially no visible light absorption ability, and has a certain strength (rigidity). For example, both the inorganic materials and the organic materials can be used advantageously.

The rigidity as referred to herein represents a physical property of the substrate that can be measured as a Taber rigidity described in JIS P8125 standard.

Examples of suitable inorganic materials include glass, quartz, and silicon.

Examples of suitable organic materials include acetate resins such as triacetyl cellulose; polyester resins such as polyethylene terephthalate (PET) and polyethylene naphthalate (PEN); polyether sulfone resins, polysulfone resins, polycarbonate resins, polyamide resins, polyimide resins, polyolefin resins, acrylic resins, polynorbornene resins, cellulose resins, polyacrylate resins, polystyrene resins, poly(vinyl alcohol) resins, polyvinyl chloride resins, polyvinylidene chloride resins, and polyacrylic resins. These resins may be used individually or in combinations of two or more thereof.

Specific examples of substrates having a peak-valley portion formed thereon include a prism sheet, a lenticular lens sheet, a fly-eye lens sheet in which lens units of identical shape are arranged in the longitudinal and lateral directions, and a diffusion sheet having a peak-valley portion formed on the surface thereof by using spherical particles.

The prism sheet may be obtained by arranging on a substrate a plurality of elongated prism lenses having a triangular cross section in the direction perpendicular to the longitudinal direction, or by arranging two-dimensionally a plurality of prisms in the form of triangular or quadrangular pyramids on a substrate with a predetermined spacing or randomly (sometimes referred to hereinbelow as "pyramid sheet"). Further, the prism sheet may be obtained by forming two-dimensionally concavities in the form of triangular or quadrangular pyramids with a predetermined spacing or randomly (sometimes referred to hereinbelow as "inverse pyramid sheet").

The lenticular lens sheet may be obtained by arranging a plurality of elongated lenticular lenses having a semicircular cross section in the direction perpendicular to the longitudinal direction on a substrate, or by arranging two-dimensionally a plurality of semispherical lenticular lenses on a substrate with a predetermined spacing or randomly.

Among the aforementioned substrates, a substrate in which non-spherical surfaces are arranged orderly, such as a prism sheet, a pyramid sheet, and an inverse pyramid sheet in which a plurality of elongated prism lenses are arranged, is preferred because of a high brightness increase ratio in the front surface direction.

—Peaks and Valleys—

A period (pitch) of peak and valley shapes in the peaks and valleys is preferably 1 µm to 150 µm, more preferably 5 µm to 100 µm. Where the period (pitch of the peak and valley shapes) exceeds 150 µm, when the substrate is used for a display, fine peaks and valleys are easily observed and glare is sometimes produced. Where the period (pitch) is less than 1 µm, the peak and valley shapes are sometimes difficult to arrange with a regular period. Further, as follows from the below-described Formula 1, a portion in which the light flux density inside the optical sheet is reduced becomes smaller. Therefore, a higher resolution is required for the photosensitive layer serving to form the optical adjustment portion, thereby sometimes making it difficult to produce an optical sheet. At the same time, because the thickness of the optical sheet decreases, the optical sheet is difficult to handle and sometimes more difficult to produce.

No specific limitation is placed on the regularity of the period (pitch) of peak and valley shapes and the period can be selected appropriately according to the object. However, when three is no regularity at all, a portion in which the light flux density inside the optical sheet is reduced is difficult to compute and the thickness of the substrate forming the photosensitive layer is difficult to select. Therefore, a certain regularity is preferred.

When the period (pitch) of the peak and valley shapes is not constant, it is preferred that the variation of the period be within a tenfold range, more preferably within a fourfold range. Where the period variation exceeds a tenfold range, the decrease in brightness increase ratio in the front surface direction is sometimes significant.

The height of the peaks and valleys is preferably 1 µm to 100 µm, more preferably 5 µm to 50 µm. Where the height of the peaks and valleys is less than 1 µm, high converging ability is sometimes difficult to demonstrate, and where the height of the peaks and valleys exceeds 100 µm, mechanical strength of peaks and valleys decreases, defects such as scratches easily occur therein, peaks and valleys are easily seen and glare is sometimes observed.

[Prism Sheet]

The prism sheet will be described below in greater detail.

When the substrate having the peak-valley portion formed thereon is a prism sheet, the prisms preferably have an isosceles triangular shape (when the prism lens is in the form of a stripe, the cross-sectional shape in the longitudinal direction) with an apex angle of 60° to 120°, more preferably 80° to 100°. Where the apex angle is less than 60° or more than 120°, the light converging effect is degraded and brightness in the front surface direction sometimes decreases.

No specific limitation is placed on the material for the peak-valley portion (prism structure), but a material with a high refractive index is preferred in terms of increasing the front surface brightness. Examples of such resins include organic compounds with a high content of halogens such as Br and Cl and sulfur that have an aromatic ring structure such as a benzene ring or a naphthalene ring.

When the resin is used as a UV-curable resin, the resin can be a mixture of a compound containing a reactive group such as a (meth)acryloyl group, a vinyl group, and an epoxy group that has the above-described structure and a compound that generates active species such as radicals and cations that can react with the compound containing reactive groups under irradiation with radiation such as UV rays. In particular, from the standpoint of curing rate, a combination of a compound containing a reactive group (monomer) that contains an unsaturated group such as a (meth)acryloyl group and a vinyl group and a photoradical polymerization initiator that generates radicals under irradiation with light is preferred.

A composition containing a compound containing a reactive group such as a (meth)acryloyl group, a vinyl group, and an epoxy group and a compound that generates active species such as radicals and cations that can react with the compound containing a reactive group under irradiation with radiation such as UV rays can be used as the aforementioned reactive group-containing compound.

In particular, from the standpoint of curing rate, a combination of a compound containing a reactive group (monomer) that contains an unsaturated group such as a (meth)acryloyl group and a vinyl group and a photoradical polymerization initiator that generates radicals under irradiation with light is preferred. Among them, compounds containing a (meth)acryloyl group such as (meth)acrylate, urethane (meth)acrylate, epoxy (meth)acrylate, and polyester (meth)acrylate are preferred. A compound containing at least one (meth)acryloyl group can be used as the compound containing a (meth)acryloyl group. If necessary, a single compound containing a reactive group (monomer) that contains an unsaturated group such as an acryloyl group and vinyl group, or a plurality of such compounds may be used.

Examples of monofunctional monomers containing one compound containing a (meth)acryloyl group as the compounds containing a (meth)acryloyl group include isobornyl (meth)acrylate, bornyl (meth)acrylate, tricyclodecanyl (meth)acrylate, dicyclopentanyl (meth)acrylate, dicyclopentanyl (meth)acrylate, cyclohexyl (meth)acrylate, benzyl (meth)acrylate, 4-butylcyclohexyl (meth)acrylate, acryloyl morpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, and methoxypolypropylene glycol (meth) acrylate.

Examples of monofunctional monomers containing an aromatic ring include phenoxyethyl (meth)acrylate, phenoxy-2-methylethyl (meth)acrylate, phenoxyethoxyethyl (meth)acrylate, 3-phenoxy-2-hydroxypropyl (meth)acrylate, 2-phenylphenoxyethyl (meth)acrylate, 4-phenylphenoxyethyl (meth)acrylate, 3-(2-phenylphenyl)-2-hydroxypropyl (meth)acrylate, (meth)acrylate of p-cumylphenol reacted with ethylene oxide, 2-bromophenoxyethyl (meth)acrylate, 4-bromophenoxyethyl (meth)acrylate, 2,4-dibromophenoxyethyl (meth)acrylate, 2,6-dibromophenoxyethyl (meth) acrylate, 2,4,6-tribromophenyl (meth)acrylate, and 2,4,6-tribromophenoxyethyl (meth)acrylate.

Examples of commercially available products of such monofunctional monomers having an aromatic ring include Aronix M113, M110, M101, M102, M5700, TO-1317 (manufactured by Toa Gosei Co., Ltd.), Viscoat #192, #193, #220, 3BM (manufactured by Osaka Organic Chemical Industry Co., Ltd.), NK Ester AMP-10G, AMP-20G (manufactured by Shin-Nakamura Chemical Co., Ltd.), Light Acrylate PO-A, P-200A, Epoxy Ester M-600A, Light Ester PO (manufactured by Kyoeisha Chemical Co., Ltd.), New Frontier PHE, CEA, PHE-2, BR-30, BR-31, BR-31M, and BR-32 (manufactured by Daiichi Kogyo Seiyaku Co., Ltd.).

Examples of unsaturated monomers having two (meth) acryloyl groups in a molecule include alkyl diol diacrylates such as 1,4-butanediol diacryatel, 1,6-hexanediol diacrylate, and 1,9-nonanediol diacryalate, polyalkylene glycol diacrylates such as ethylene glycol di(meth)acrylate, tetraethylene glycol diacrylate, and tripropylene glycol diacrylate, neopentyl glycol di(meth)acrylate, and tricyclodecane methanol diacrylate.

Examples of unsaturated monomers having a bisphenol skeleton include ethylene oxide bisphenol A (meth)acrylic acid ester adduct, ethylene oxide tetrabromobisphenol A (meth)acrylic acid ester adduct, propylene oxide bisphenol A (meth)acrylic acid ester adduct, propylene oxide tetrabromobisphenol A (meth)acrylic acid ester adduct, bisphenol A epoxy (meth)acrylate obtained by an epoxy ring-opening reaction of bisphenol A diglycidyl ether and (meth)acrylic acid, tetraboromobisphenol A epoxy (meth)acrylate obtained by an epoxy ring-opening reaction of tetrabromobisphenol A diglycidyl ether and (meth)acrylic acid, bisphenol F epoxy (meth)acrylate obtained by an epoxy ring-opening reaction of bisphenol F diglycidyl ether and (meth)acrylic acid, and tetrabromobisphenol F epoxy (meth)acrylate obtained by an epoxy ring-opening reaction of tetrabromobisphenol F diglycidyl ether and (meth)acrylic acid.

Examples of commercially available products of unsaturated monomers having such structure include Viscoat #700, #540 (manufactured by Osaka Organic Chemical Industry Co., Ltd.), Aronix M-208, M210 (manufactured by Toa Gosei Co., Ltd.), NK Ester BPE-100, BPE-200, BPE-500, A-BPE-4 (manufactured by Shin-Nakamura Chemical Co., Ltd.), Light Ester BP-4EA, BP-4PA, Epoxy Ester 3002M, 3002A, 3000M, 3000A (manufactured by Kyoeisha Chemical Co., Ltd.), KAYARAD R-551, R-712 (manufactured by Nippon Kayaku Co., Ltd.), BPE-4, BPE-10, BR-42M (manufactured by Daiichi Kogyo Seiyaku Co., Ltd.), Lipoxi VR-77, VR-60, VR-90, SP-1506, SP-1507, SP-1509, SP-1563 (manufactured by Showa High Polymer Co., Ltd.), and Neopole V779 and Neopole V779MA (manufactured by Japan U-PiCA Co., Ltd.).

Examples of (meth)acrylate unsaturated monomers that have a degree of functionality of three or more include (meth) acrylates of polyhydric alcohols having three or more hydroxyl groups, for example, trimethylol propane tri(meth) acrylate, pentaerythritol tri(meth)acrylate, trimethylol propane trioxyethyl (meth)acrylate, and tris(2-acryloyloxyethyl) isocyanurate. Examples of commercially available products of such monofunctional monomers having an aromatic ring include Aronix M305, M309, M310, M315, M320, M350, M360, M408, (manufactured by Toa Gosei Co., Ltd.), Viscoat #295, #300, #360, GPT, 3PA, #400 (manufactured by Osaka Organic Chemistry Industries Co., Ltd.), NK Ester TMPT, A-TMPT, A-TMM-3, A-TMM-3L, A-TMMT (manufactured by Shin-Nakamura Chemical Col, Ltd.), Light Acrylate TMP-A, TMP-6EO-3A, PE-3A, PE-4A, DPE-6A (manufactured by Kyoeisha Chemical Co., Ltd.), and KAYARAD PET-30, GPO-303, TMPTA, TPA-320, DPHA, D-310, DPCA-20, DPCA-60 (manufactured by Nippon Kayaku Co., Ltd.).

An urethane (meth)acrylate oligomer may be also compounded. Examples of urethane (meth)acrylate oligomers include urethane (meth)acrylate oligomers manufactured from polyether polyols such as polyethylene glycol and polytetramethyl glycol; polyester polyols obtained by a reaction of a dibasic acid such as succinic acid, adipic acid, azelaic acid, sebacic acid, phthalic acid, tetrahydro(anhydro)phthalic acid, and hexahydro(anhydro)phthalic acid and a diol such as ethylene glycol, propylene glycol, diethylene glycol, triethylene glycol, tetraethylene glycol, dipropylene glycol, 1,4-butanediol, 1,6-hexanediol, and neopentyl glycol; poly ε-caprolactone-modified polyols; polyols modified with polymethylvalerolactone; alkyl polyols such as ethylene glycol, propylene glycol, 1,4-butanediol, 1,6-hexanediol, and neopentylglycol; polyols modified alkylene oxides and having a bisphenol A skeleton, such as bisphenol A ethylene oxide adduct and bisphenol A propylene oxide adduct; polyols modified with alkylene oxides and having a bisphenol F skeleton such as bisphenol F ethylene oxide adduct and bisphenol F propylene oxide adduct, or mixtures thereof and organic polyisocyanates such as tolylene diisocyanate, isoboron diisocyanate, hexamethylene diisocyanate, diphenylmethane diisocyanate and xylylene diisocyanate and a hydroxy-containing (meth)acrylate such as 2-hydroxyethyl (meth)acrylate and 2-hydroxypropyl (meth)acrylate. The urethane (meth)acrylate oligomer is preferred for maintaining the appropriate viscosity of the curable composition of the present invention.

Examples of commercially available monomers of these urethane (meth)acrylates include Aronix M120, M-150, M-156, M-215, M-220, M-225, M-240, M-245, M-270 (manufactured by Toa Gosei Co., Ltd.), AIB, TBA, LA, LTA, STA, Viscoat #155, IBXA, Viscoat #158, #190, #150, #320, HEA, HPA, Viscoat #2000, #2100, DMA, Viscoat #195, #230, #260, #215, #335HP, #310HP, #310HG, #312 (manufactured by Osaka Organic Chemical Industry Co., Ltd.), Light Acrylate IAA, L-A, S-A, BO-A, EC-A, MTG-A, DMP-A, THF-A, IB-XA, HOA, HOP-A, HOA-MPL, HOA-MPE, Light Acrylate 3EG-A, 4EG-A, 9EG-A, NP-A, 1,6HX-A, DCP-A (manufactured by Kyoeisha Chemical Co., Ltd.), KAYARADTC-110S, HDDA, NPGDA, TPGDA, PEG400DA, MANDA, HX-220, HX-620 (manufactured by Nippon Kayaku KK), FA-511A, 512A, 513A (manufactured by Hitachi Chemical Co., Ltd.), VP (manufactured by BASF A.G.), ACMO, DMAA, DMAPAA (manufactured by Kojin Co., Ltd.).

An urethane (meth)acrylate oligomer is obtained as a reaction product of (a) a hydroxy-containing (meth)acrylate, (b) an organic polyisocyanate, and (c) a polyol and is preferably a reaction product obtained by reacting (a) a hydroxy-containing (meth)acrylate with (b) an organic polyisocyanate and then reacting with (c) a polyol.

The above-described unsaturated monomers may be used singly or, if necessary, in combination.

Examples of photoradical polymerization initiators include acetophenone, acetophenone benzyl ketal, 1-hydroxycyclohexyl phenyl ketone, 2,2-dimethoxy-2-phenyl acetophenone, xanthone, fluorenone, benzaldehyde, fluorenone, anthraquinone, triphenylamine, carbazole, 3-methyl acetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholinopropane-1-one, 2,4,6-trimethylbenzoyldiphenyl phosphineoxide, bis-(2,6-dimethoxybenzoyl)-2,4,4-trimethylpentyl phosphineoxide, and ethyl-2,4,6-trimethylbenzoylethoxyphenyl phosphineoxide.

Examples of commercially available products of photoradical polymerization initiators include Irgacure 114, 369, 651, 500, 119, 907, 714, 2959, CGI1700, CGI1750, CGI1150, CH24-61, Darocur 1116, 1173 (manufactured by Chiba Specialty Chemicals Co., Ltd.), Lucirin LR1728, 1193X (manufactured by BASF A.G.), Ebecryl P36 (manufactured by UCB Co., Ltd.), and KIP150 (manufactured by Lamberti S.p.A). Among them, Lucirin LR1193X is preferred because of good solubility thereof in liquids and high sensitivity.

The photoradical polymerization initiator is compounded in the entire composition at 0.01% by mass to 10% by mass, preferably 0.5% by mass to 7% by mass. As for the upper limit of the compounded amount of the photoradical polymerization initiator, the aforementioned range is preferred from the standpoint of curing characteristic of the composition, mechanical and optical properties of the cured product, and handleability. As for the lower limit of the compounded amount of the photoradical polymerization initiator, the aforementioned range is preferred from the standpoint of preventing the decrease in curing rate.

A photosensitizer can be further compounded with the composition of the present invention. Examples of suitable photosensitizers include triethylamine, diethylamine, N-methyldiethanolamine, ethanolamine, 4-dimethylaminobenzoic acid, 4-dimethylaminobenzoic acid, 4-dimethylaminobenzoic acid ethyl, and 4-dimethylaminobenzoic acid isoamyl. Examples of commercially available products include Ebecryl P102, 103, 104, 105 (manufactured by UCB Co., Ltd.).

If necessary, an antioxidant, a UV absorber, a photostabilizer, a silane coupling agent, a surface modifier, a thermal polymerization inhibitor, a leveling agent, a surfactant, a colorant, a preservation and stabilizing agent, a plasticizer, a lubricant, a solvent, a filler, an antiaging agent, a wettability modifier, a parting agent and the like can be compounded as additives in addition to the above-described components.

Examples of antioxidants include Irganox 1010, 1035, 1076, 1222 (manufactured by Chiba Specialty Chemicals Co., Ltd.), Antigen P, 3C, FR, GA-10 (manufactured by Sumitomo Chemical Industries Co., Ltd.). Examples of UV absorbers include Tinuvin P, 234, 320, 326, 327, 328, 329, 213 (manufactured by Chiba Specialty Chemicals Co., Ltd.) and Seesorb 102, 103, 110, 501, 202, 712, 704 (manufactured by Shipro Kasei Kaisha). Examples of photostabilizers include Tinuvin 292, 144, 622LD (manufactured by Chiba Specialty Chemicals Co., Ltd.), Sanol LS770 (manufactured by Sankyo Co., Ltd.), and Sumisorb TM-061 (manufactured by Sumitomo Chemical Industries Co., Ltd.). Examples of silane coupling agents include γ-aminopropyltriethoxysilane, γ-mercaptopropyltrimethoxysilane, γ-methacryloxypropyltrimethoxysilane, and commercially available products, such as SH6062, 6030 (manufactured by Toray Silicone Co., Ltd.), and KBE903, 603, 403 (manufactured by Shin-Etsu Chemical Co., Ltd.). Examples of coating surface modifiers include silicone additives such as dimethylcyclohexane polyether and nonionic fluorine-containing surfactants, examples of commercially available products of silicone additives include DC-57, DC-190 (manufactured by Dow Corning Co., Ltd.), SH-28PA, SH-29PA, SH-30PA, SH-190 (manufactured by Toray Dow Corning Silicon Co., Ltd.), KF351, KF352, KF353, KF354 (manufactured by Toray Silicone Co., Ltd.), L-700, L-7002, L-7500, FK-024-90 (manufactured by Nippon Unicar Co., Ltd.). Examples of commercially available products of nonionic fluorine-containing surfactants include FC-430, FC-171 (manufactured by 3M Co.), Megafac F-176, F-177, R-08 (manufactured by Dainippon Ink and Chemicals, Inc.). Examples of parting agents include Plysurf A208F (manufactured by Daiichi Kogyo Seiyaku Co., Ltd.).

Any organic solvent may be used for adjusting the viscosity of the liquid resin of the present invention, provided that it can be homogeneously mixed with the liquid resin, that is, without precipitates, phase separation, turbidity, and the like. Examples of suitable solvents include acetone, methyl ethyl ketone, methyl isobutyl ketone, ethanol, propanol, butanol, 2-methoxyethanol, cyclohexanol, cyclohexane, cyclohexanone, and toluene. If necessary, these solvent may be used in mixtures of a plurality thereof. When an organic solvent is added, steps of drying and evaporating the organic solvent in the product manufacturing process are required. When a large amount of non-evaporated solvent remains in the product, mechanical properties of the product are degraded, and there is a risk that the organic solvent will evaporate and diffuse when the product is used, thereby generating unpleasant odor and adversely affecting the health. Therefore, it is undesirable that an organic solvent with a high boiling point remain in a large amount in the product. On the other hand, when a solvent with a low boiling point is used, the surface is roughened by vigorous evaporation, water of condensation adheres to the composition surface due to heat of evaporation, traces of the water of condensates become surface defect, and vapor concentration increases, thereby raising the risk of causing fire. Therefore, the preferred boiling point of the solvent is 50° C. or higher and 150° C. or lower, more preferably within a range from 70° C. to 120° C. Form the standpoint of solubility of the starting materials and boiling point, methyl ethyl ketone (bp. 79.6° C.) and 1-propanol (bp. 97.2° C.) are preferred as the organic solvent.

The amount of the organic solvent that is added to the liquid resin of the present invention depends on the type of the solvent and the viscosity of the liquid resin prior to the addition of the solvent, but in order to improve coating ability sufficiently this amount is within a range of from 10% by mass to 40% by mass, preferably from 15% by mass to 30% by mass. Where this amount is too small, the viscosity reduction effect and coating quantity increase effect are reduced and coating ability is not improved sufficiently. However, where the dilution is performed with excessive amount of the solvent, the viscosity becomes too low, the liquid flows over the sheet-like body, and nonuniform distribution occurs, or the liquid flows over to the rear surface of the sheet-like body. Another problem is that sufficient drying cannot be attained in the drying process, a large amount of the organic solvent remains in the product, product functions are degraded, and the solvent evaporates when the product is used, thereby potentially generating unpleasant odor and adversely affecting the health.

The liquid resin of the present invention can be manufactured by mixing the aforementioned components by the usual method and, if necessary, can be manufactured by dissolution under heating.

The viscosity of the liquid resin of the present invention that is prepared in the above-described manner is usually 10 mPa·s/25° C. to 50,000 mPa·s/25° C. When the liquid resin is fed to a base material or an emboss roll, if the viscosity is too high, a homogeneous composition is difficult to feed, and when a lens is manufactured, the coating becomes nonuniform or swollen and gas bubbles are admixed thereto, thereby making it difficult to obtain the target lens thickness and demonstrate a sufficient lens performance. This trend becomes especially evident when the line speed is increased. Therefore, in such case, the lower is the liquid viscosity the better, and the preferred viscosity is 10 mPa·s to 100 mPa·s, even more preferably 10 mPa·s to 50 mPa·s. Such a low viscosity can be obtained by adding an appropriate amount of the organic solvent. Further, the viscosity can be also adjusted by thermally setting the coating liquid. On the other hand, where the viscosity after solvent evaporation is too low, when press molding is performed with an emboss roll, the lens thickness is difficult to control and a lens of constant and uniform thickness sometimes cannot be formed. The preferred viscosity is 100 mPa·s to 3,000 mPa·s. When an organic solvent is mixed, a step of evaporating the organic solvent by thermal drying or the like can be introduced between the step of feeding the liquid resin to the step of press molding with an emboss roll. In such case, the liquid can be fed uniformly at a low viscosity when the liquid resin is fed, whereas during pressure molding with an emboss roll, it is possible to press mold uniformly the liquid whose viscosity has been increased by drying the organic solvent.

Here, it is especially preferred that a cured material obtained by curing the liquid resin of the present invention have the below-described physical properties. Firstly, the refractive index of the cured material at 25° C. is preferably 1.55 or more, more preferably 1.56 or more. Where the refractive index is less than 1.55, when an optical sheet is formed using the present composition, a sufficient front brightness is sometimes impossible to ensure.

Secondly, the softening point of the cured material is preferably 40° C. or more, and especially preferably 50° C. or more. Where the softening point is less than 40° C., heat resistance is sometimes insufficient.

A material can be also used in which the refractive index is increased by introducing a finely powdered inorganic material that has a high refractive index. Examples of such inorganic materials with a high refractive index include Si (refractive index=3.5), $TiO_2$ (refractive index=2.2 to 2.7), $CeO_2$ (refractive index=2.2), $ZrO_2$ (refractive index=2.1), $In_2O_3$ (refractive index=2.0), $La_2O_3$ (refractive index=1.95), $SnO_2$ (refractive index=1.9), $Y_2O_3$ (refractive index=1.82), and $Sb_2O_5$ (refractive index=2.09 to 2.29).

A smaller particle size of inorganic particles with a high refractive index is preferred because the resin transparency is increased. More specifically, the particle size is preferably 100 nm or less, more preferably 50 nm or less, and even more preferably 20 nm or less.

The inorganic particles with a high refractive index can be used by mixing with the usual UV-curable resin. Therefore, by mixing the inorganic particles with a high refractive index with a UV-curable resin that has the above-described high refractive index, it is possible to obtain a UV-curable resin with even higher refractive index.

Further, the prism sheet can be fabricated by a method by which a prism sheet template roll made from a metal and having a sawtooth profile is pressed against a molten thermoplastic sheet of a polycarbonate or the like, or by a method by which a similar thermoplastic resin is molded by pressing into a template having a sawtooth profile on one side.

[Diffusion Sheet]

The case in which the substrate having a peak-valley portion formed thereon is a diffusion sheet will be described below.

No specific limitation is placed on the method of imparting diffusion ability to the diffusion sheet. Thus, diffusion particles may be introduced into the sheet, or a resin with a different refractive index may be admixed, or air beads or hollow beads may be introduced. Further, the diffusion effect can be imparted by employing a specific surface shape by roughening the light diffusion surface, for example, by causing beads to adhere to the surface, shotblasting, or introducing a soluble substance that is dissolved after molding.

More specifically, the following diffusion sheets can be used.

The diffusion sheet is formed by coating a coating liquid composed of a resin, a volatile liquid, and particles on a substrate and drying.

In addition to the resin, volatile liquid, and particles, the coating liquid can also include, if necessary, other components.

No specific limitation is placed on the resin and it can be selected appropriately according to the object. Examples of suitable resins include acrylic resins and styrene-butadiene resins.

Examples of volatile liquid include methyl ethyl ketone (MEK), cyclohexanone, toluene, and water.

The particles have a spherical shape, an ellipsoidal shape, or a comma-like shape.

The mean particle size of the particles may be larger than the average thickness of the dried coating layer and is preferably 0.5 µm to 50 µm.

The mean particle size of the particles can be measured, for example, with a measurement device using a dynamic light scattering method or a laser diffraction method.

No specific limitation is placed on the particles and they can be appropriately selected according to the application. For example, organic particles and inorganic particles can be used.

No specific limitation is placed on the organic particles and they can be selected appropriately according to the application. Examples of suitable particles include poly(methyl methacrylate) resin particles, melamine resin particles, polystyrene resin particles, and silicone resin particles. These particles may be used singly or in combination.

The organic particles preferably have a crosslinked structure. Acrylic resin particles having a crosslinked structure are preferred as the organic particles having a crosslinked structure.

No specific limitation is placed on the inorganic particles and they can be selected appropriately according to the application. Examples of suitable particles include talc, calcium carbonate, silicon, and alumina. These particles may be used individually or in combinations of two or more thereof.

The amount of particles added to the resin is preferably 1 part by mass to 1,000 parts by mass, preferably 25 parts by mass to 400 parts by mass per 100 parts by mass of the resin. Where the amount added is less than 1 part by mass, the function of the particles as a light diffusion agent sometimes cannot be demonstrated, and when the amount added is more than 1,000 parts by mass, the particles are sometimes difficult to disperse.

No specific limitation is placed on the value representing the ratio of the refractive index of the resin and the refractive index of the particles and this value can be adjusted appropriately according to the object. For example, this value is preferably 0.9 to 1.1, more preferably 0.95 to 1.05, as represented by a refractive index of a D ($n^{25}$) line measured at a temperature of 25° C.

Where the value representing the ratio of the refractive index of the resin and the refractive index of the particles is less than 0.9 or more than 1.1, the reflective light component at the interface of the particles and resin increases and light transmissivity sometimes decreases.

No specific limitation is placed on the other components and they can be selected appropriately according to the object. Examples of such components include an agent preventing the particles from precipitating, a fluorine surfactant, a scattering agent, a thickener, a cationic surfactant, an anionic surfactant, a curing agent, a crosslinking agent, a photopolymerization initiation, and monomers.

Examples of the agents preventing the particles from precipitating include fatty acid amides, polyethylene oxide, metallic soaps, organic bentonites, and hydrogenated castor oil wax. Among them, fatty acid amides and polyethylene oxide are especially preferred. These agents may be used singly or in combination.

Scattering agents have a function of light scattering agents similarly to the above-described particles and can further improve light scattering ability.

No specific limitation is placed on the mean particle size of the scattering agent, and it can be selected appropriately according to the object. For example, the mean particle size of 1 µm to 5 µm is preferred.

The mean particle size of the scattering agent can be measured with a measurement device using a dynamic light scattering method or a laser diffraction method, but such measurement methods are not limiting.

No specific limitation is placed on the material of the scattering agent. For example, it can be silica, calcium carbonate, alumina, and zirconia.

No specific limitation is placed on the amount of the scattering agent in the coating liquid, and this amount can be selected appropriately according to the object. For example, this amount is preferably 1 part by mass to 20 parts by mass based on the total amount of the coating liquid.

No specific limitation is placed on the thickener, and it can be selected appropriately according to the object. For example, an acrylamide amine salt can be used.

The amount of the thickener added to the resin is preferably 0.1 part by mass to 10 parts by mass per 100 parts by mass of the resin.

No specific limitation is placed on the fluorine-containing surfactant, and it can be selected appropriately according to the object. Examples of suitable fluorine surfactants include fluorine-containing anionic surfactants and fluorine-containing amphoteric surfactants. The amount of the fluorine-containing surfactant added to the resin is preferably 0.001 part by mass to 0.1 part by mass per 100 parts by mass of the resin.

The coating liquid preferably has a surface tension of 40 N/m or less, more preferably 30 N/m or less. Where the surface tension is more than 40 N/m, the surface state of the coated layer can degraded.

The surface tension of the coating liquid can be measured, for example, with an automatic surface tension meter (CBVP-A3, manufactured by Kyowa Interface Science Co., Ltd.).

No specific limitation is placed on the viscosity of the coating liquid, and it can be selected appropriately according to the object. Preferably the viscosity is 10 mPa·s to 200 mPa·s, more preferably 5 mPa·s to 150 mPa·s at 25° C. Where the viscosity is less than 10 mPa·s, the precipitation ability of particles is sometimes difficult to maintain, and where the viscosity exceeds 200 mPa·s, liquid pumping ability, coating ability, and surface state are sometimes degraded.

The viscosity of the coating liquid can be measured, for example, with a E-type viscometer (ELD type) manufactured by Tokyo Keiki KK.

No specific limitation is placed on the concentration of solids in the coating liquid, and the concentration can be selected appropriately according to the object. It is preferred that the concentration be 10 parts by mass to 40 parts by mass, more preferably 20 parts by mass to 30 parts by mass per 100 parts by mass of the coating liquid.

<Optical Adjustment Portion>

The optical adjustment portion is provided inside the substrate or on the surface thereof and differs in an optical property from the substrate.

In the optical sheet of the present invention, a plurality of optical adjustment portions are formed at least in part of a non-passage portion for the light in the substrate in the case where a parallel beam falls from the first surface in the direction normal to a surface located opposite the first surface. A plurality of the optical adjustment portions are preferably provided in the thickness direction of the substrate with a predetermined spacing.

Here, the light non-passage portion means a portion where a light flux density substantially decreases, a certain light introduced by Fresnel reflection or stray light being excluded. More specifically, the non-passage portion denotes a portion in which the light flux density becomes less than 50% that of a portion in which the light flux density inside the optical sheet becomes the highest.

Figure 4:
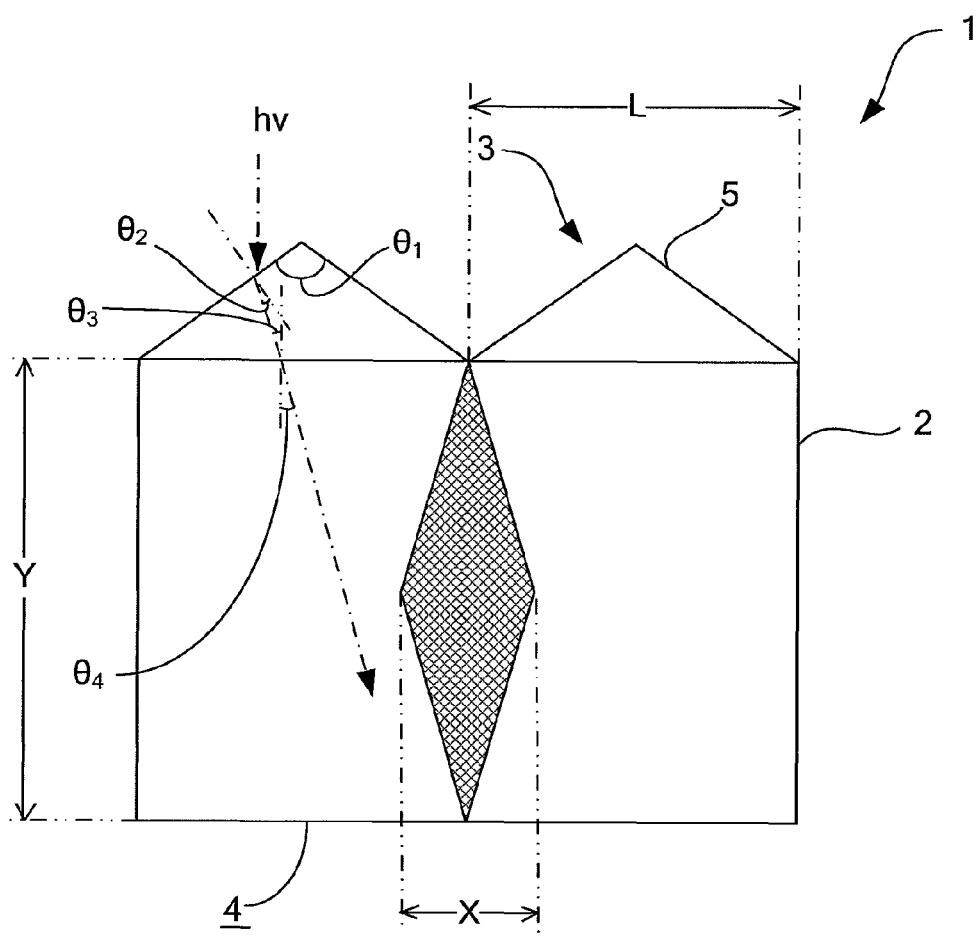
FIG. 4 is a schematic drawing illustrating a light non-passage portion.

Regarding the light non-passage portion, the explanation below will be conducted with respect to the case in which the optical sheet is a prism sheet in which a plurality of elongated prism lenses, for example, with a cross section in the form of an isosceles triangle, are arranged parallel each other as shown in FIG. 4.

As shown in FIG. 4, when a parallel beam hv falls on an optical sheet 1 in the direction normal to a surface 4 located opposite a first surface 3 from the side of the first surface 3 having a peak-valley portion 5, a light non-passage portion inside the optical sheet 1, that is, inside a substrate 2, can be represented by a hatched region (a non-passage portion 6) in FIG. 4.

The non-passage portion 6 has a rhomboidal cross section with a height Y and a width X that are represented by the following Equations 1.

$$\theta O_2 = \arcsin(\sin(90-(\theta_1/2)))/n_1);$$

$$\theta_3 = 90-(\theta_1/2)-\theta_2;$$

$$\theta_4 = \arcsin(n_1 \cdot \sin \theta_3/n_2);$$

$$Y = L \cdot ((1/(2 \cdot \tan \theta_4))-(1/(2 \cdot \tan(\theta_1/2))));$$

$$X = Y \cdot \tan \theta_4. \quad \text{Equations 1}$$

where $\theta_1$: apex angle of the prism;

L: length (pitch) of the bottom side of the prism;

$n_1$: refractive index of the molded prism article (peak-valley portion 5);

$n_2$: refractive index of substrate 2 ($n_1=n_2$ when it is prepared by extrusion molding and is of the same material as the molded prism article);

$\theta_2$: angle at which light goes out from the air layer into the prism (peak-valley portion 5) in the case where a parallel beam hv falls in the direction normal to the surface 4 located opposite the first surface;

$\theta_3$: angle at which the light falls from the prism (peak-valley portion 5) onto the substrate 2; and $\theta_4$: angle at which the light goes out from the prism (peak-valley portion 5) to the substrate 2.

Therefore, as follows from Equations 1, for example, when $\theta_1=90°$, L=50 μm, $n_1=1.59$, and $n_2=1.65$, the height Y and width X of the non-passage portion 6 can be calculated as:

Y=52.4 μm;

X=16.9 μm.

A plurality of the optical adjustment portions that differ in an optical property from the substrate are formed at least in part of the light non-passage portion. The optical adjustment portions may be formed in any way, provided that a plurality thereof are formed in the thickness direction of the substrate at least in part of the non-passage portion.

Figure 5A:
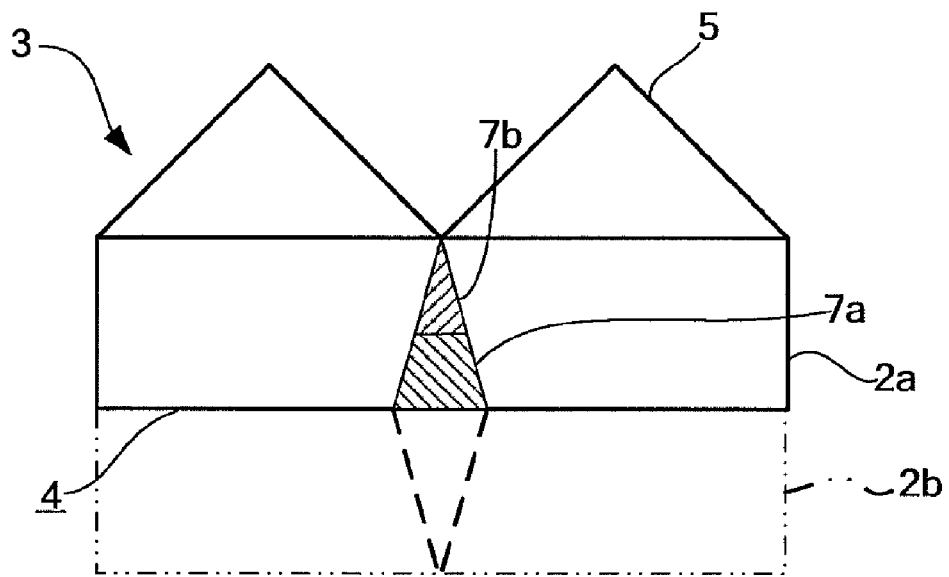
FIG. 5A is a schematic drawing illustrating an example of an optical adjustment portion formed in the optical sheet of the present invention.

As for the mode of forming a plurality of the optical adjustment portions at least in part of the non-passage portion, as shown in FIG. 5A, a first optical adjustment portion 7a that has a triangular cross section and a second optical adjustment portion 7b that has a trapezoidal cross section may be formed, the two portions being parts of the non-passage portion 6.

Further, as shown by a two-dot broken line in FIG. 5A, another substrate 2b may be further laminated on the surface 4 located opposite the first surface in the substrate 2 where the first optical adjustment portion 7a and the second optical adjustment portion 7b are formed.

Figure 5B:
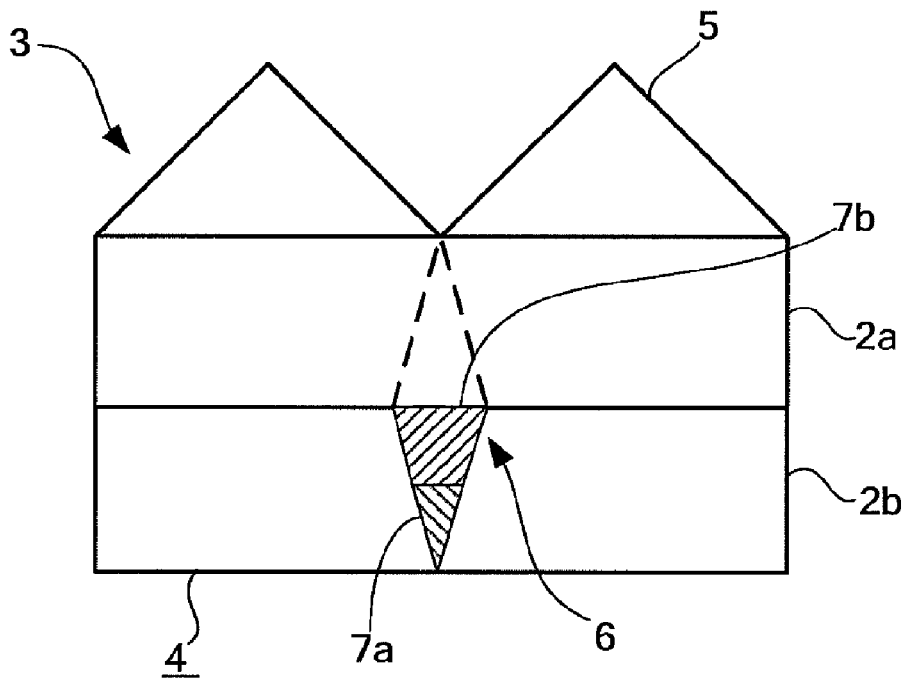
FIG. 5B is a schematic drawing illustrating an example of an optical adjustment portion formed in the optical sheet of the present invention.

As shown in FIG. 5B, the first optical adjustment portion 7a that has an inverse triangular cross section and the second optical adjustment portion 7b that has an inverse trapezoidal cross section may be formed, the two portions being parts of the non-passage portion 6.

Figure 5C:
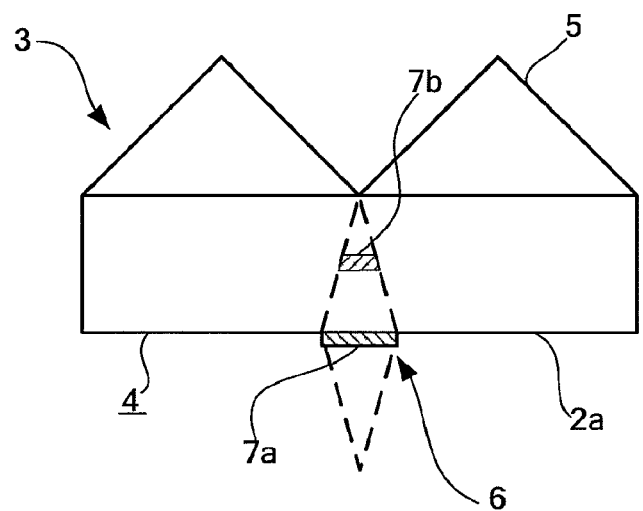
FIG. 5C is a schematic drawing illustrating an example of an optical adjustment portion formed in the optical sheet of the present invention.

Further, as shown in FIG. 5C, the first optical adjustment portion 7a may be formed on the surface 4 located opposite the first surface in the substrate 2 and the second optical adjustment portion 7b may be formed between the surface 4 and the peak-valley portion 5, the two optical adjustment portions being parts of the non-passage portion 6.

The first optical adjustment portion 7a and the second optical adjustment portion 7b of the present invention are not limited to the above-described specific examples, provided that they may be formed with a predetermined spacing or thickness in the thickness direction of the substrate at least in part of the non-passage portion.

Examples of the optical property include light reflectivity, light diffusion ability, and difference in refractive index. By providing the first optical adjustment portion 7a and the second optical adjustment portion 7b with light reflectivity and light diffusion ability and also providing a difference in refractive index between the optical adjustment portion and the substrate, it is possible to form easily the optical adjustment portion 7 that has an optical property different from that of the substrate that has substantially no visible light absorption ability.

The optical adjustment portions 7 that that have light reflectivity, light diffusion ability, and differ in refractive index from the substrate will be described below.

[Optical Adjustment Portion Having Light Reflectivity]

The optical sheet of the present invention preferably has a plurality of regions (optical adjustment portions) that differ in an optical property from the substrate in any portion where the light flux density decreases inside the substrate or on the surface thereof in the case where a parallel beam falls from the first surface of the substrate having a peak-valley portion formed thereon in the direction normal to a surface located opposite the first surface.

For example, a portion having positive reflectivity such as a metal film may be formed as the optical adjustment portion that differs in an optical property, or such optical adjustment portion may be formed by a white layer having diffusion reflectivity. More specifically, for example, as shown in FIG. 5C, a metal film having light reflectivity can be formed by vapor deposition on a metal and the optical adjustment portion 7a and the optical adjustment portion 7b can be formed on the second surface (surface located opposite the first surface) 4 of the substrate 2 and between the second surface 4 and the peak-valley portion 5.

Examples of metals suitable for the metal film having positive reflectivity include gold, silver, aluminum, platinum, palladium, rubidium, rhodium, osmium, iridium, mercury, copper, iron, and nickel. Among them, a metal film obtained by vapor depositing silver or aluminum is more advantageous because of high reflectance. The aforementioned metals may be used singly or in the form of alloy containing two or more of them.

No specific limitation is placed on the thickness of the metal film and the thickness can be selected appropriately according to the object, provided that the metal film does not transmit light, however the thickness of 100 nm or less is preferred.

Examples of layers suitable as the white layer with diffusion reflectivity include layers containing inorganic particles of Si (refractive index=3.5), $TiO_2$ (refractive index=2.2 to 2.7), $CeO_2$ (refractive index=2.2), $ZrO_2$ (refractive index=2.1), $In_2O_3$ (refractive index=2.0), $La_2O_3$ (refractive index=1.95), $SnO_2$ (refractive index=1.9), $Y_2O_3$ (refractive index=1.82), $Sb_2O_5$ (refractive index=2.09 to 2.29), zinc oxide, barium oxide, calcium oxide, silica, and the like, a layer containing particles having the air inside thereof, such as hollow particles, and a porous layer. Among them, a layer of titanium oxide can be more advantageously used because of a high refractive index and excellent reflectivity. A layer containing the air in hollow particles is even more preferred because of a large difference in refractive index with a binder and excellent reflectivity.

The diameter of the particles that are added is preferably 0.1 μm to 5 μm, more preferably 0.2 μm to 1 μm. Where the diameter of the particles that are added is less than 0.1 μm, reflectivity sometimes decreases, and where it is more than 5 μm, a perfect design of the white layer thickness is sometimes difficult to attain. Further, because the particles protrude from the white layer, a perfect design is sometimes difficult to attain.

The particles are added in a binder. No specific limitation is placed on the binder and it can be selected appropriately according to the object. Specific examples of the binder include gelatin, poly(vinyl alcohol), poly(vinyl pyrrolidone), modified cellulose such as methyl cellulose, ethyl cellulose, diacetyl cellulose, triacetyl cellulose, and carboxylated cellulose, starch, polyethylene oxide, polypropylene oxide, acetal resin, Nylon, phenolic resins, poly(vinyl butyral), poly(vinyl formal), vinyl acetate, acrylic acid such as polyacrylic acid, polymethacrylic acid, and esters thereof, polyolefin resins such as polystyrene, polyethylene and polypropylene, polyester resins, poly(vinylidene chloride) resins, ethylene-vinyl acetate resins, vinyl chloride, and rubbers such as SBR and NBR.

No specific limitation is placed on the amount of particles added and it can be selected appropriately according to the object, however this amount is preferably within a range of from 1% by volume to 90% by volume based on the volume of the binder. Where the amount added is less than 1% by volume, light reflectivity sometimes decreases or an excessive thickness is required for the white layer, and where the amount added exceeds 90% by volume, durability of the white layer sometimes decreases, resulting in defects such as scratches.

The light reflectance of the optical adjustment portion having light reflectivity is preferably 5% to 100%, more preferably 50% to 100%. Where the reflectance is less than 5%, the effect of the optical adjustment portion having light reflectivity is sometimes difficult to demonstrate.

[Optical Adjustment Portion Having Light Diffusion Ability]

The optical sheet of the present invention preferably has a plurality of regions (optical adjustment portions) with light diffusion ability in any portion where the light flux density decreases inside the substrate or on the surface thereof in the case where a parallel beam falls from the first surface having a peak-valley portion formed thereon in the direction normal to a surface located opposite the first surface. If a plurality of optical adjustment portions with light diffusion ability are present, the light that cannot be converged onto the front surface in the conventional configurations, can be also used by changing the optical paths in a combined manner The light scattering as referred to herein indicates a state in which the ratio of reflected light to transmitted light is equal to or less than 1.

The optical adjustment portion having light diffusion ability can be formed, for example, by incorporating particles with a low refractive index such as PMMA and silica into a binder with a comparatively high refractive index, such as styrene, or by forming fine peaks and valleys on the surface by using a layer containing particles.

[Optical Adjustment Portion Having Difference in Refractive Index]

The optical sheet of the present invention preferably has a plurality of regions (optical adjustment portions) that differ in a refractive index from the substrate in any portion where the light flux density decreases inside the substrate or on the surface thereof in the case where a parallel beam falls from the first surface of the substrate having a peak-valley portion formed thereon in the direction normal to a surface located opposite the first surface. If a plurality of optical adjustment portions of a different refractive index are present, the light that cannot be converged onto the front surface and used in the conventional configurations is refracted, whereby the optical paths are changed in a combined manner, and the desirable effect of returning the light to the incidence surface or converting the light in the front surface direction is vividly demonstrated.

The refractive index of the portion (non-passage portion 6) where the light flux density decreases inside the substrate in the case where a parallel beam falls from the first surface in the direction normal to a surface located opposite the first surface may be higher or, conversely, lower than the refractive index of the substrate and can be appropriately selected by an optical design. In particular, in the case of a prism sheet, the first optical adjustment portion 7a and the second optical adjustment portion 7b that have different refractive indexes that are both higher than the refractive index of the substrate 2 may be formed in the region between the second surface 4 in the portion (non-passage portion 6) where the light flux density decreases inside the substrate 2 in the case where a parallel beam falls in the direction normal to the second surface 4, and the surface where the peak-valley portion 5 is formed, as shown in FIG. 5A, or the first optical adjustment portion 7a and the second optical adjustment portion 7b that have different refractive indexes that are both lower than the refractive index of the substrate 2 may be formed inside another substrate 2B in the non-passage portion 6, as shown in FIG. 5B.

Such a configuration is preferred because the optical path of the light that has been totally reflected by the inclined surfaces of the prism and emitted to the outside in the conventional configuration, that is, the incident light that can become the so-called side lobe light, is refracted in the direction closer to the front surface direction (direction normal to the substrate), and the light can be returned to the rear surface side by causing twice the positive reflection thereof on the inclined surfaces of the prism, thereby increasing the light converging efficiency.

Here, the difference between the refractive index of the first optical adjustment portion 7a and the second optical adjustment portion 7b constituting the optical adjustment portion and the refractive index of the substrate is preferably 0.05 or more, more preferably 0.1 or more. Where the difference in refractive index is less than 0.05, good refraction of the optical path of the incident light that can become the side lobe light cannot be performed and the converging efficiency can decrease.

Portions of the substrate other than the optical adjustment portion that differs in the refractive index are preferably formed using a photopolymerizable material. In the case of a photopolymerizable material, when a self-alignment system is used in the below-described method for manufacturing the optical sheet of the present invention, the portion (light non-passage portion) in which the light flux density decreases is not polymerized by the incident parallel beam and cavities can be formed by development. By filling the cavities with a material that differs in the refractive index from the photopolymerizable material, it is possible to form easily an optical adjustment portion that differs in the refractive index.

No specific limitation is placed on the photopolymerizable material and it can be selected appropriately according to the object. Thus, materials obtained by adding a photopolymerization initiator to the conventional radical polymerizable or cation polymerizable monomers can be used.

The polymerizable monomers that are monofunctional or polyfunctional can be appropriately used singly or in combination From the standpoint of stabilizing the development, it is preferred that a polyfunctional monomer, rather than a monofunctional one, be partially admixed.

The refractive index of the optical adjustment portions 7a, 7b can be selected appropriately by the combination of the aforementioned materials. From the standpoint of easiness of optical design, this refractive index is preferably 1.45 to 1.65.

Optical adjustment portions 7a, 7b with a refractive index higher than that of the substrate 2 can be formed by casting a material with a high refractive index into a cavity formed by the development. The preferred examples of such materials with a high refractive index include hot-melt materials and photopolymerizable materials. The hot-melt materials and photopolymerizable materials are preferred because flowability or non-flowability thereof can be controlled by temperature or light. Further, from the standpoint of facilitating the casting of the material into the cavity formed by the development, it is preferred that flowability be imparted by adding an organic solvent. In this case, the organic solvent used is preferably dried by heating in the subsequent process. Further, where the hot-melt materials and photopolymerizable materials are organic materials, they preferably have a high refractive index and contain an aromatic ring such as a benzene ring and a naphthalene ring, a halogen compound, for example, a chlorine compound or a bromine compound, or sulfur in a molecule.

It is also preferred that fine inorganic particles be added to impart the optical adjustment portions 7a, 7b with a high refraction index.

Examples of fine inorganic particles with a high refractive index include Si (refractive index=3.5), $TiO_2$ (refractive index=2.2 to 2.7), $CeO_2$ (refractive index=2.2), $ZrO_2$ (refractive index=2.1), $In_2O_3$ (refractive index=2.0), $La_2O_3$ (refractive index=1.95), $SnO_2$ (refractive index=1.9), $Y_2O_3$ (refractive index=1.82), and $Sb_2O_5$ (refractive index=2.09 to 2.29). The particle size of these fine inorganic particles is preferably 100 nm or less, more preferably 50 nm or less, and even more preferably 20 nm or less. With the object of imparting the material with light diffusion ability and light reflectivity, particles with a size larger than 100 nm can be added.

—Second Substrate—

The optical sheet of the present invention preferably has a multilayer structure in which a rigid second substrate that has substantially no visible light absorption ability is further laminated on a surface located opposite the first surface of the substrate having a peak-valley portion formed thereon. A sheet-like body is preferably joined as the second substrate.

Laminating the second substrate is preferred from the standpoint of improving the handleability of the optical sheet by the appropriate rigidity of the second substrate.

No specific limitation is placed on the sheet suitable for the second substrate and the conventional well-known sheets can be used. Specific examples thereof include polyester-based sheets such as polyethylene terephthalate and polyethylene naphthalate sheets, and also TAC-based sheets.

The rigid sheet that has substantially no visible light absorption ability and will be joined may have peaks and valleys formed on the surface thereof. No specific limitation is placed on the shape of peaks and valleys, and examples of suitable sheets include a prism sheet, a lenticular lens sheet, a fly-eye lens sheet, a pyramid sheet having quadrangular pyramids arranged two-dimensionally thereon, an inverse pyramid sheet having quadrangular pyramidal concavities arranged two-dimensionally thereon, and a diffusion sheet having peaks and valleys formed on the surface thereof by using spherical particles, as used for the first support.

Bonding the second substrate having a peak-valley portion formed on the surface thereof is preferred because the brightness from the front surface of the optical sheet can be increased and also because the rigidity of the optical sheet can be increased.

Any conventional well-known method can be used for bonding together the first substrate and the second substrate. Examples of suitable methods include a method by which an adhesive is applied to the entire surface of one substrate or part thereof and the two substrates are joined together and a method by which part of one substrate is melted and the other substrate is bonded thereto. In the case where the second substrate having peaks and valleys on the surface thereof is bonded, it is preferred that the two substrates be bonded together via an air layer provided between the second substrate and the first substrate. In order to provide the air layer, it is preferred that the two substrates be bonded partially.

The second substrate may be formed on the first substrate by coating a coating liquid containing a resin and drying, or by coating a coating liquid containing a photocurable resin or the like and exposing to cure the photocurable resin.

—Applications of the Optical Sheet of the Present Invention—

The optical sheet of the present invention excels in a light convergence function and a light diffusion function and demonstrates excellent brightness increase ratio in the desired angular direction, in particular the front surface direction. Therefore, the optical sheet can be advantageously used in liquid-crystal display devices for cellular phones, monitors for personal computers, television sets, liquid-crystal projectors, and the like. More specifically, the optical sheet can be used advantageously by providing it, with the peaks and valleys facing up, on the upper surface of a light guiding plate of a surface light source device of an edge light system that is used as a backlight in liquid-crystal display devices.

Further, because the optical sheet has an especially good light converging ability in the necessary angular direction, it can be more advantageously used in the above-described liquid crystal devices to reduce the amount of light outgoing in the unnecessary angular directions, that is, the side lobe light and increase the brightness of the liquid-crystal display devices.

(Method for Manufacturing the Optical Sheet)

The method for manufacturing an optical sheet of the present invention has a plurality of unit steps including at least a photosensitive layer formation step, an exposure step, and an optical adjustment portion formation step, and if necessary includes other steps such as a peak-valley portion formation step, a development step (liquid development step), and a second substrate formation step.

In the method for manufacturing an optical sheet in the present embodiment, the photosensitive layer formation step, exposure step, and optical adjustment portion formation step are performed as a plurality of unit steps that are performed at least in the order of description. For example, a first photosensitive layer formation step, a first exposure step, and a first optical adjustment portion formation step are performed, then a substrate layer formation step is performed in which a substrate layer demonstrating an optical property substantially identical to that of the substrate is formed, and then a second photosensitive layer formation step in which a photosensitive layer is formed, a second exposure step, and a second optical adjustment portion formation step are performed again on the substrate layer. Therefore, the photosensitive layer and the optical adjustment portion are formed in a plurality of cycles with a predetermined spacing in the thickness direction of the substrate.

<Peak-Valley Portion Formation Step>

In the peak-valley portion formation step, a peak-valley portion that converges and scatters the light is formed on at least one surface (first surface) of the substrate. When the commercial prism sheet, lenticular lens sheet, fly-eye lens sheet, diffusion sheet, or the like is used, the peak-valley portion formation step can be omitted.

The peak-valley portion may be also formed on the surface (the below-described fourth surface) located opposite the first surface of the substrate in the optical sheet of the present invention.

No specific limitation is placed on a method for forming the peak-valley portion, and the conventional well-known method can be used therefor. For example, a peak-valley portion can be formed by coating a coating liquid containing a photocurable resin or the like on the substrate, pressing the substrate against a metal mold having a peak-valley portion formed thereon, exposing, curing the photocurable resin, and removing the mold.

Further, the peak-valley portion can be also formed by a method by which a prism sheet template roll made from a metal and having a sawtooth profile is pressed against a molten thermoplastic sheet of a polycarbonate or the like, or by a method by which a similar thermoplastic resin is molded by pressing into a template having a sawtooth profile on one side.

When the peak-valley portion is formed by particles or the like and has diffusion ability, the peak-valley portion can be formed by the method explained in the section concerning the diffusion sheet.

The below-described method for manufacturing a prism sheet may be used for manufacturing the substrate having a peak-valley portion formed thereon.

The materials of the substrate and peak-valley portion, and other details relating thereto have been described in the explanation of the optical sheet.

—Method for Manufacturing a Prism Sheet—

Figure 3:
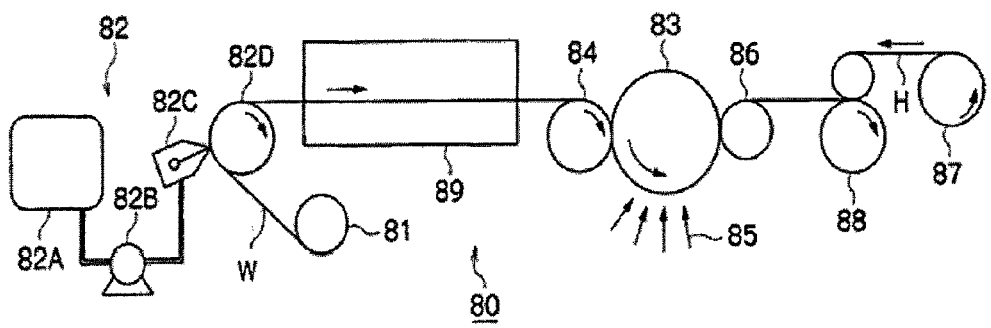
FIG. 3 is a schematic drawing illustrating an example of an apparatus for manufacturing a prism sheet.

An example of the method for manufacturing a prism sheet will be described below with reference to the appended drawings. FIG. 3 is a conceptual diagram illustrating the configuration of an apparatus 80 for manufacturing a prism sheet to which the present invention is applied. The apparatus 80 for manufacturing a prism sheet is composed of a sheet-like article feed means 81, a coating means 82, a drying means 89, an emboss roll 83, which is a peak-valley roll, a nip roll 84, a resin curing means 85, a peeling roll 86, a protective film feed means 87, and a sheet pick-up means 88.

The sheet feed means 81, which is the sheet-like article feed means, feeds out a sheet W that is a sheet-like body and is composed of a feed-out roll onto which the sheet W is wound.

A typical width of the sheet W is 0.1 m to 3 m, a typical length of the sheet W is 1,000 m to 100,000 m, and a typical thickness of sheet W is 1 μm to 300 μm. However, other sizes can be also used.

The sheet W may be subjected in advance to a corona discharge treatment, a plasma treatment, a treatment facilitating adhesiveness, a heat treatment, and a dust removal treatment. The surface roughness Ra of the sheet W is preferably 3 nm to 10 nm in a cut-off value of 0.25 mm.

The sheet W may be also provided in advance with a prime layer such as an adhesive layer, or another functional layer may be formed in advance on the rear surface. A sheet composed of two or more layers, rather than only of one layer, can be also employed as the sheet W. The sheet W is preferably a reflective body or a semireflective body that can transmit light.

The coating means 82 is a device for coating a radiation-curable resin on the surface of the sheet W, this device being composed of a feed source 82A for feeding the radiation-curable resin, a feed device (pump) 82B, a coating head 82C, a support roll 82D that serves for winding and supporting the sheet W during coating, and piping for feeding the radiation-curable resin feed source 82A to the coating head 82C. In the configuration shown in FIG. 3, an extrusion-type die coater is used as the coating head.

The drying means 89 can be of any well-known system, provided that the coating liquid coated on the sheet W can be dried uniformly. For example, it can be a tunnel-type drying apparatus shown in FIG. 3. The drying system of a radiation heating type, hot air circulation type, far-IR radiation type, and vacuum type can be used.

The emboss roll 83 is required to have a highly accurate peak-valley pattern, a high mechanical strength, and a high degree of roundness and be capable of transferring the peak-valley portion present on the roll surface onto the surface of the sheet W. A metal roll is preferred as the emboss roll 83.

A regular fine peak-valley pattern is formed on the outer circumferential surface of the emboss roll 83. Such regular fine peak-valley pattern has to be of a shape obtained by inverting the fine peak-valley pattern of the surface of the prism sheet that is a product.

The objects for the prism sheet are, for example, a lenticular lens or a prism lens in which fine peak-valley patterns are arranged two-dimensionally, or a fly-eye lens and a flat lens in which fine pyramidal bodies such as circular cones or pyramids are disposed in the XY directions, these lenses having fine peak-valley patterns that are arranged three-dimensionally. The regular fine peak-valley pattern on the outer circumferential surface of the emboss roll 83 correspond thereto.

Examples of methods that can be used to form the regular fine peak-valley pattern on the outer circumferential surface of the emboss roll 83 include a method by which the surface of the emboss roll 83 is machined with a diamond bite (single point) and a method by which peaks and valleys are directly formed on the surface of the emboss roll 83 by photoetching, electron beam lithography, or laser machining. Further, a method can be employed by which peaks and valleys are formed by photoetching, electron beam lithography, laser machining, or optical molding on the surface of a thin sheet-like body made from a metal, and the sheet-like body is then wound around a roll and fixed thereto to form the emboss roll 83. Yet another suitable method for obtaining the emboss roll 83 includes the steps of forming peaks and valleys by photoetching, electron beam lithography, laser machining, or optical molding on the surface of a material that can be easier machined than metals forming a thin metal sheet-like body by forming an inverted mold of the peak-valley shape by electroforming or the like, and winding the sheet-like body around a roll and fixing thereto. In particular, the advantage of forming the inverted mold by electroforming or the like is that a plurality of sheet-like bodies of the same shape can be obtained from one mother plate.

The surface of the emboss roll 83 is preferably subjected to a parting treatment. Subjecting the surface of the emboss roll 83 to a parting treatment makes it possible to maintain a good shape of the fine peak-valley pattern. Well-known methods, for example, coating with a fluororesin, can be employed as the parting treatment. It is also preferred that the emboss roll 83 be provided with a drive means. The emboss roll 83 rotates in the counterclockwise (CCW) direction as shown by the arrow in the figure.

The nip roll 84 forms a pair with the emboss roll 83 and serves for roll molding, while applying pressure to the sheet W. The nip roll is required to have a predetermined mechanical strength and degree of roundness. Where the longitudinal elastic modulus (Young's modulus) of the surface of the nip roll 84 is too small, the roll molding becomes insufficient, and where the longitudinal elastic modulus is too large, the surface actively reacts to the penetration of foreign matter, such as dust, and defects are easily formed in the surface. Accordingly, the appropriate value of the longitudinal elastic modulus is preferred. It is also preferred that the nip roll 84 be provided with a drive means. The nip roll 84 rotates in the clockwise (CW) direction as shown by the arrow in the figure.

A pressure application means is preferably provided at any one of the emboss roll 83 or nip roll 84 so as to provide a predetermined pressure force between the emboss roll 83 and the nip roll 84. Likewise, it is preferred that a fine adjustment means be provided at any one of the emboss roll 83 or nip roll 84 so as to enable the accurate control of the gap (clearance) between the emboss roll 83 and the nip roll 84 and the pressure.

The resin curing means 85 is a radiation irradiation means provided opposite the emboss roll 83 downstream of the nip roll 84. The resin curing means 85 cures the resin layer by radiation via the sheet W. Therefore, it is preferred that the resin curing means be capable of irradiating with radiation corresponding to the curing characteristic of the resin and also capable of irradiating with a radiation dose corresponding to the conveying rate of the sheet W. For example, a cylindrical irradiation lamp with a length substantially equal to the width of sheet W can be employed as the resin curing means 85. A plurality of cylindrical irradiation lamps can be provided parallel to each other, and a reflective plate can be also provided at the rear surface of the cylindrical lamp.

The peeling roll 86 is disposed opposite the emboss roll 83 and serves to peel off the sheet W from the emboss roll 83. The peeling roll is required to have a predetermined mechanical strength and degree of roundness. In the peeling zone, the sheet W is peeled off from the emboss roll 83 and wound around the peeling roll 86, while sandwiching the sheet W that is wound around the circumferential surface of the emboss roll 83 between the rotating emboss roll 83 and the peeling roll 86. This operation has to be performed reliably, and it is preferred that the peel roll 86 be provided with a drive means. The peel roll 86 rotates clockwise (CW) as shown in the figure.

When the temperature of the resin or the like rises due to curing, it is important that the sheet W be cooled during peeling to ensure reliable peeling. Accordingly, a configuration in which the peeling roll 86 is provided with a cooling means can be also employed.

A configuration can be also employed (not shown in the figures) in which a plurality of backup rolls are disposed opposite the emboss roll between the pressure application zone (9 o'clock position) of the emboss roll 83 and the peel-off position (3 o'clock position) and the curing treatment is performed while applying pressure to the sheet W by the plurality of backup rolls and the emboss roll 83.

The sheet pick-up means 88 serves to accommodate the sheet W after it has been peeled off, this means is composed of a pick-up roll that picks-up the sheet W. In the sheet pick-up means 88, a protective film H that is fed from the protective film feed means 87 provided adjacently to the sheet pick-up means is fed onto the surface of the sheet W, and the two films are laminated and accommodated in the sheet pick-up means 88.

In the apparatus 80 for manufacturing the prism sheet, guide rolls or the like for forming a conveying path for the sheet W may be provided between the coating means 82 and the emboss roll 83 and between the peeling roll 86 and the sheet pick-up means 88. In addition, if necessary, a tension roll or the like can be also provided to absorb the slack of the sheet W during conveying.

Thus, a prism sheet can be fabricated in which rows of lenses are arranged adjacently to each other over substantially over the entire surface, each row having prism-shaped unit lenses formed in one direction.

<Photosensitive Layer Formation Step>

In the photosensitive layer formation step, a photosensitive layer is formed on the surface located opposite the first surface of the substrate where the peak-valley portion is formed.

No specific limitation is placed on the method for forming the photosensitive layer and this method can be selected appropriately according to the object. For example, the photosensitive layer can be formed by coating a coating liquid for the photosensitive layer on the surface located opposite the first surface of the substrate and drying.

The coating can be performed with the well-known coating means such as a spin coater, roll coater, bar coater, and a curtain coater.

The temperature in the drying step is preferably 60° C. to 140° C., more preferably 80° C. to 120° C. The drying time is preferably 10 sec to 2 min, more preferably 10 sec to 1 min.

The photosensitive layer may be a positive photosensitive layer or a negative photosensitive layer.

When the positive photosensitive layer is of an alkali development type, the composition contains at least a binder having an acid value and quinonediazide.

Examples of suitable binders include phenol novolac resins, polymers containing a carboxylic acid such as polyacrylic acid, polymethacrylic acid, and polymaleic acid, and copolymers with monomers having unsaturated double bonds copolymerizable therewith. Among them, phenol novolac resins are especially preferred.

Examples of solvents that can dissolve such composition include ketone solvents such as methyl ethyl ketone and methyl isobutyl ketone, ester solvents such as ethyl acetate, propyl acetate and butyl acetate, and alcohol solvents such as normal propanol, ethanol, and methanol. Among them, ketone solvents such as methyl ethyl ketone are especially preferred.

In addition, a surfactant, a matting agent, a wax for imparting sliding ability, and the like can be appropriately used in the photosensitive layer.

From the standpoint of reducing the number of production steps, it is preferred that fine white particles be contained in the photosensitive layer with the object of providing for diffusion reflection ability. Examples of suitable layers include a layer containing inorganic particles such as Si (refractive index=3.5), $TiO_2$ (refractive index=2.2 to 2.7), $CeO_2$ (refractive index=2.2), $ZrO_2$ (refractive index=2.1), $In_2O_3$ (refractive index=2.0), $La_2O_3$ (refractive index=1.95), $SnO_2$ (refractive index=1.9), $Y_2O_3$ (refractive index=1.82), $Sb_2O_5$ (refractive index=2.09 to 2.29), zinc oxide, barium sulfate, calcium carbonate, and silica as the fine white particles, a layer containing particles having the air inside thereof, such as hollow particles, and a porous layer. Among them, titanium oxide is especially preferred because of a high refractive index and excellent reflectivity. An air-containing layer such that contains hollow particles is more preferred because of a high difference in refractive index with the binder and excellent reflectivity.

A photocurable photosensitive layer that loses bonding ability due to photopolymerization can be also used as the positive photosensitive layer. Such a layer is preferred because the development with a liquid becomes unnecessary, thereby making it possible to reduce the number of production steps.

When the positive photosensitive layer is a photocurable photosensitive layer, the composition can contain a binder, a polymerizable monomer, and a photopolymerization initiator. The binder is added with the object of controlling the adhesivity of a non-cured film; the conventional binders can be used. Among them, acrylic resins are preferred because of good mutual solubility with the monomer.

Examples of preferred polymerizable monomers include those having an unsaturated double bond in a molecule, representative example thereof being an acryl monomer. More specifically, a compound containing a (meth)acryloyl group, a functional monomer having an aromatic ring, an unsaturated monomer having two (meth)acryloyl groups in a molecule, an unsaturated monomer having a bisphenol skeleton, a (meth)acrylate unsaturated monomer that has a functionality of three or more, and an urethane (meth)acrylate oligomers, such as enumerated in the explanation of the prism sheet, can be used appropriately as the polymerizable monomer.

When a monomer having an unsaturated double bond in a molecule is used, it is preferred that the atmosphere be replaced with an inactive gas, such as nitrogen, during exposure, or that a cover film with oxygen barrier property be used in order to prevent polymerization damage caused by oxygen.

Any conventional well-known material may be used for the cover film with oxygen barrier property, but a material with a low oxygen permeability is preferred. A film with a poly (vinyl alcohol) coating, poly(ethylene terephthalate), and polypropylene can be used as the material with high oxygen barrier property.

A cation polymerizable monomer such as oxetane can be also used as the polymerizable monomer. More specifically, a compound with a molecular weight of 1,000 or less that has a cyclic ether group such as an epoxy group, an oxetane group, and an oxolane group, an acryl or vinyl compound having the above-described substitution group in a side chain, a carbonate compound, a melamine compound with a low molecular weight, vinyl ethers, vinyl carbazols, a styrene derivative, an alpha-methylstyrene derivative, vinyl alcohol esters such as an ester compound of vinyl alcohol and acryl or methacryl, and other monomers having a cation-polymerizable vinyl bond can be used. Cation-polymerizable monomers are preferred because polymerization thereof is not affected by oxygen.

It is preferred that a photoradical generating agent (a photoradical polymerization initiator), provided it is radical polymerizable, be used as the photopolymerization initiator. More specifically, photoradical polymerization initiators such as acetophenone that were enumerated in the explanation of the prism sheet can be used.

When a cation polymerizable monomer is used, an agent generating an acid under light irradiation, such as an onium salt, is preferably used as the photopolymerization initiator. Specific examples of such agents include onium salts, diazonium salts, quinonediazide compounds, organohalides, aromatic sulfonate compounds, bisulfone compounds, sulfonyl compounds, sulfonate compounds, sulfonium compounds, sulfamide compound, iodonium compounds, sulfonyldiazomethane compounds, and mixtures thereof.

<Exposure Step>

The exposure step is a step in which the photosensitive layer is exposed by irradiation with a parallel beam from the first surface in the direction normal to a surface located opposite the first surface of the substrate.

When the positive photosensitive layer is of an alkali development type, the exposed portion, that is, the light passage portion, becomes soluble in the developing liquid or the like and only the photosensitive layer of the non-exposed portion, that is, the light non-passage portion, remains on the substrate as a result of the development.

When the positive photosensitive layer is of a photocurable type, the exposed portion, that is, the light passage portion, loses adhesivity due to a polymerization reaction, adhesion of the developer can be controlled, and an image can be formed.

In the case of a negative photosensitive layer, only the exposed portion, that is, the light passage portion, is cured, the development removes the photosensitive layer of the non-exposed portion, that is, the light non-passage portion, and the photosensitive layer of only the exposed portion remains on the substrate.

No specific limitation is placed on the exposure method, but it is necessary that a parallel beam can fall in the direction normal to the sheet. More specifically, examples of suitable exposure methods include an exposure method using a digital exposure apparatus employing laser radiation or the like, and an exposure method using an analog exposure apparatus in which a parallel beam is generated by converting the light from a light source with a lens system.

No specific limitation is placed on the analog exposure and it can be selected appropriately according to the object. For example, a method can be used by which the exposure is performed using a high-pressure mercury lamp, an ultrahigh-pressure mercury lamp, or a xenon lamp.

No specific limitation is placed on the digital exposure and it can be selected appropriately according to the object. For example, a method using spatial light modulation devices that are arranged two-dimensionally can be used, and a two-dimensional image can be formed by performing relative scanning, while modulating the light based on the image data.

Among them, a method using laser radiation is preferred, because irradiation with a parallel beam can be easily performed.

<Optical Adjustment Portion Formation Step>

The optical adjustment portion formation step is a step of forming an optical adjustment portion that differs in an optical property from the substrate on the substrate or substrate layer, this portion being the non-exposed portion of the photosensitive layer.

When the positive photosensitive layer is of an alkali development type, the photosensitive layer of only the non-exposed portion remains on the substrate, and the optical adjustment portion is formed in the photosensitive layer of the non-exposed portion. A variety of methods can be used for forming the optical adjustment portion. Specific examples include the following methods: (1) a method using adhesivity of the positive photosensitive layer and causing adhesion of a powdered toner; (2) a method by which a sheet-like toner layer is stacked on the surface of a positive photosensitive layer, thermal lamination is performed at an appropriate temperature, the toner sheet is peeled off, the toner layer is transferred onto the portion of the positive photosensitive layer, and an optical adjustment portion is provided; (3) a method by which an optical adjustment member is introduced in advance into the positive photosensitive layer and an optical adjustment portion is formed simultaneously with the alkali development; and (4) a method by which a toner layer containing an optical adjustment member is coated on the upper layer (on the side of the opposite surface of the substrate) of the positive photosensitive layer, a two-layer structure containing the photosensitive layer and a colorant layer is produced, and an optical adjustment portion is formed simultaneously with the development. These methods are preferred because the light of the exposure step can be used effectively and sensitivity can be increased. A member having diffusion reflectivity of white light is preferred as the optical adjustment member to be contained in the powder toner, toner layer of the toner sheet, and positive photosensitive layer.

When the positive photosensitive layer is of a photocurable type, the exposed portion, that is, the light passage portion, loses adhesivity due to a polymerization reaction, adhesion of the developer can be controlled, and an optical adjustment portion is formed in the non-exposed portion that retains adhesivity.

Examples of suitable methods for forming the optical adjustment portion include: (1) a method by which a powdered toner is caused to adhere and (2) a method by which a sheet-like toner layer is stacked on the surface of a positive photosensitive layer, thermal lamination is performed at an appropriate temperature, the toner sheet is peeled off, the toner layer is transferred onto the portion of the positive photosensitive layer, and an optical adjustment portion is provided. A member having diffusion reflectivity of white light is preferred as the powdered toner and the toner layer of the toner sheet.

In the case of the negative photosensitive layer, the photosensitive layer of the non-exposed portion is removed from the substrate. The optical adjustment portion is formed in the non-exposed portion where the photosensitive layer is not present.

Examples of methods for forming the optical adjustment portion include: (1) a method by which a metal reflective layer is vapor deposited and the remaining portion of the negative photosensitive layer is then peeled off together with the metal reflective layer by using a stripping solution of a strong acid or a strong alkali, and (2) a method by which the portion of the substrate from which the photosensitive layer of the non-exposed portion has been removed is filled with a resin that has a different refractive index or a resin monomer.

<Liquid Development Step>

The liquid development step is a step in which the exposed portion of the photosensitive layer or the photosensitive layer of the non-exposed portion is removed using a liquid. The liquid development step can be performed after the exposure step as a cycle of the optical adjustment portion formation step, or between the exposure step and the optical adjustment portion formation step.

No specific limitation is placed on the method for removing the uncured region and such method can be selected appropriately according to the object. For example, a method using a liquid developer can be employed.

No specific limitation is placed on the liquid developer and it can be selected appropriately according to the object. Examples of suitable liquid developers include alkali aqueous solution, aqueous liquid developers, and organic solvents. Among them, weakly alkali aqueous solutions are preferred. Examples of base components of weakly alkali aqueous solutions include lithium hydroxide, sodium hydroxide, potassium hydroxide, lithium carbonate, sodium carbonate, potassium carbonate, lithium bicarbonate, sodium bicarbonate, potassium bicarbonate, sodium phosphate, potassium phosphate, sodium pyrophosphate, potassium pyrophosphate, and borax.

<Second Substrate Formation Step>

The second substrate formation step is a step of forming at least one layer of the second substrate on the surface located opposite the first surface of the substrate (first substrate). The second substrate may have a monolayer structure or a multilayer structure containing two or more layers.

No specific limitation is placed on the method for forming the second substrate and the method can be selected appropriately according to the object. For example, a sheet-like second substrate may be attached to the first substrate with an adhesive or the like. Alternatively, the second substrate may be formed by coating a coating liquid containing a resin on the first substrate and drying, or by coating a coating liquid containing a photocurable resin or the like on the first substrate and curing the photocurable resin by exposure.

The present invention can resolve the aforementioned problems inherent to the related art and attain the below-described object and provide an optical sheet that excels in a light convergence function or a light diffusion function, has excellent brightness increase ratio in the desired angular direction, in particular the front surface direction, and greatly inhibits the side lobe, and also a method for manufacturing such an optical sheet with good efficiency and high accuracy.

EXAMPLES

Examples of the present invention will be described below. However, the present invention is not limited to these Examples. Note that "part" denotes "part by mass" unless otherwise indicated.

<Fabrication of Substrate Having a Peak-Valley Portion Formed Thereon>

A prism sheet was fabricated in the below described manner as the substrate having a peak-valley portion formed thereon.

<Preparation of Prism Layer Coating Liquid>

A prism layer coating liquid of the following composition was prepared.

The coating liquid was prepared by loading the below-described composition into a mixing tank and stirring under heating at a temperature of 50° C. to dissolve the components. The refractive index of the prism layer after curing was 1.59. The refractive index of the prism layer was measured with a prism coupler refractive index measurement device (SPA4000, manufactured by Sairon Technology Inc.) on a flat coating film formed by using the same liquid.

Ebecryl 3700 (manufactured by Daicel UBC Co., Ltd.) . . . 2.55 parts

NK Ester BPE-200 (manufactured by Shin-Nakamura Chemical Co., Ltd.) . . . 0.85 part Aronix M-110 (manufactured by Toa Gosei Co., Ltd.) . . . 0.85 parts New Frontier BR-31 (manufactured by Daiichi Kogyo Seiyaku Co., Ltd.) . . . 4.25 parts Methyl ethyl ketone . . . 2.89 parts Lucirin TPO-L (manufactured by BASF A.G.) . . . 0.17 parts

[Fabrication of Prism Sheet A]

The prism layer coating liquid prepared in the above-described manner was coated to obtain a dry weight of 14 g/m² on the first surface of a transparent substrate made from PET, having a thickness of 7.6 μm and subjected on both surfaces to a treatment facilitating adhesion. The coating was dried for 1 min at 80° C., and the prism sheet was then pressed against a metal mold (die) having a stripe-like prism shape with an apex angle of 90° and a pitch (bottom side length) of 50 μm engraved thereon. In this state, the exposure at an exposure dose of 1,500 mJ/cm² was performed using a high-pressure mercury lamp from a surface located opposite the first surface of the PET substrate, the die was peeled off, and a prism sheet A (substrate having a peak-valley portion formed thereon) was obtained.

[Fabrication of Prism Sheet B]

The prism layer coating liquid prepared in the above-described manner was coated to obtain a dry weight of 14 g/m² on the first surface of a transparent substrate made from PET, having a thickness of 25 μm and subjected on both surfaces to a treatment facilitating adhesion. The coating was dried for 1 min at 80° C., and the prism sheet was then pressed against a metal mold (die) having a stripe-like prism shape with an apex angle of 90° and a pitch (bottom side length) of 50 μm engraved thereon. In this state, exposure at an exposure dose of 1,500 mJ/cm² was performed using a high-pressure mercury lamp from a surface located opposite the first surface of the PET substrate, the die was peeled off, and a prism sheet B (substrate having a peak-valley portion formed thereon) was obtained.

<Preparation of Coating Liquid for Positive Photosensitive Layer>

A coating liquid for a positive photosensitive layer of the following composition was prepared.

Phenol novolac resin (manufactured by Sumitomo Durez Co., Ltd., PR-50716, melting point 76° C.) . . . 2.5 parts Phenol novolac resin (manufactured by Sumitomo Durez Co., Ltd., PR-51600B, melting point 55° C.) . . . 3.5 parts 1,2-Naphthoquinone (2) diazido-4-sulfonic acid cumyl phenol ester . . . 2.0 parts Methyl ethyl ketone . . . 40 parts Propylene glycol monomethyl ether acetate . . . 20 parts by mass.

Surfactant (manufactured by Dainippon Ink and Chemicals, Inc., Megafac F-176 PF) . . . 0.1 parts <Preparation of Coating Liquid for Negative Photosensitive Layer (Photocurable Liquid Resin 1)>

A coating liquid for a negative photosensitive layer of the following composition was prepared.

Benzyl methacrylate-methacrylic acid copolymer (molar ratio 73/27) . . . 100 parts Pentaerythritol tetraacrylate . . . 80 parts Lucirin TPO-L (manufactured by BASF A.G.) . . . 1.6 parts Methyl ethyl ketone . . . 1,134 parts Propylene glycol monomethyl ether acetate . . . 486 parts Surfactant (manufactured by Dainippon Inks and Chemicals Co., Ltd., Megafac F-176 PF) . . . 0.2 parts <Preparation of Coating Liquid for White Reflective Layer>

A coating liquid of the following composition for a white reflective layer for forming the optical adjustment portion was prepared.

[Composition of Mother Liquid for White Pigment Dispersion]

Poly(vinyl butyral) (Eslex B BL-SH, manufactured by Sekisui Chemical Co., Ltd.) . . . 2.7 parts Rutile-type titanium oxide (JR805, manufactured by Teika KK, weight-average particle size 0.29 μm) . . . 35.0 parts Dispersion enhancer (Solsperse 20000, manufactured by Avecia KK) . . . 0.35 parts n-Propyl alcohol . . . 62.0 parts This composition was dispersed using zirconia beads in a Motor Mill M50 manufactured by Aigar KK to prepare a mother liquid for white pigment dispersion.

[Composition of Coating Liquid for White Reflective Layer]

Mother liquid for a white pigment dispersion prepared in the above-described manner . . . 1,200 parts Wax compound Stearic acid amide (Neutron 2, manufactured by Nippon fine Chemical Co., Ltd.) . . . 5.7 parts Behenic acid amide (Diamid BM, manufactured by Nippon Kasei Chemical Co., Ltd.) . . . 5.7 parts Lauric acid amide (Diamid Y, manufactured by Nippon Kasei Chemical Co., Ltd.) . . . 5.7 parts Palmitic acid amide (Diamid KP, manufactured by Nippon Kasei Chemical Co., Ltd.) . . . 5.7 parts Erucic acid amide (Diamid L-200, manufactured by Nippon Kasei Chemical Co., Ltd.) . . . 5.7 parts Oleic acid amide (Diamid O-200, manufactured by Nippon Kasei Chemical Co., Ltd.) . . . 5.7 parts Rosin (KE-311, manufactured by Arakawa Chemical Industries, Ltd.; composition: resin acid 80% to 97%; resin acid components: abietic acid 30 to 40%, neoabietic acid 10% to 20%, dihydroabietic acid 14%, tetrahydroabietic acid 14%) . . . 80.0 parts—Surfactant (Megafac F-780F, content of solids 30%, manufactured by Dainippon Ink and Chemicals Co., Ltd.) . . . 16.0 parts n-Propyl alcohol . . . 1,600 parts Methyl ethyl ketone . . . 580 parts <Preparation of Alkali Liquid Developer>

An alkali liquid developer containing the following components was prepared.

Sodium carbonate . . . 59 parts

Sodium bicarbonate . . . 32 parts
Water . . . 720 parts
Butyl cellosolve . . . 1 part <Alkali Peeling Solution>

An alkali peeling solution of the following composition was prepared.

1N aqueous solution of sodium hydroxide . . . 1,000 parts
Butyl cellosolve . . . 1 part Example 1

Fabrication of White Reflective Sheet

A white reflective sheet was fabricated by coating a coating liquid for a white reflective layer prepared in the above-described manner to a dry film thickness of 2 μm on a PET substrate with a thickness of 20 μm and drying for 2 min at a temperature of 100° C.

<Fabrication of Optical Sheet>

In Example 1, as described hereinbelow, a substrate had a multilayer structure, and a plurality of optical adjustment portions were formed on parts of light non-passage portions of the substrates.

Figure 6A:
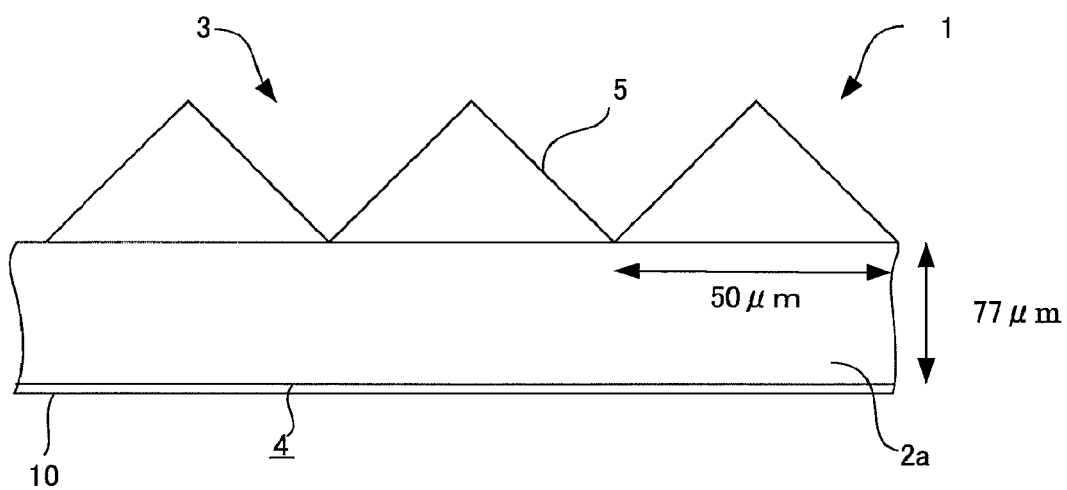
FIG. 6A is a schematic drawing illustrating a process (first step) for manufacturing the optical sheet of Example 1 of the present invention.

As shown in FIG. 6A, a negative photosensitive layer 11 was formed on the second surface 4 of the substrate 2a by coating the coating liquid for a negative photosensitive layer (photocurable liquid resin 10) prepared in the above-described manner to a dry film thickness of 0.5 μm on the flat second surface 4 of the prism sheet A fabricated in the above-described manner (substrate 2a having a peak-valley portion 5 formed thereon) and drying for 2 min at a temperature of 100° C.

Figure 6B:
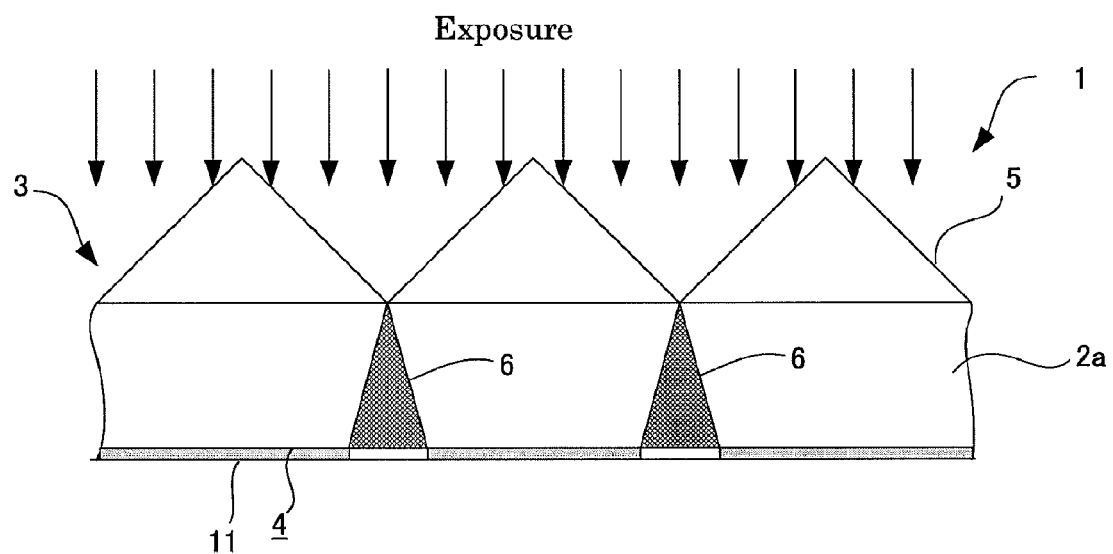
FIG. 6B is a schematic drawing illustrating a process (second step) for manufacturing the optical sheet of Example 1 of the present invention.

Then, as shown in FIG. 6B, the negative photosensitive layer 11 was exposed by irradiation with UV radiation parallel to the direction normal to the flat second surface 4 by using a parallel beam irradiation device (Mask Alignment Device M-2L, manufactured by Mikasa KK) from the side of the first surface 3 of the substrate 2a where the peak-valley portion 5 was formed.

Here, as shown in FIG. 6B, the hatched portion is the light non-passage portion (portion with a low light flux density) 6, and a portion of the negative photosensitive layer 11 that was not affected by the light non-passage portion 6 was cured.

Figure 6C:
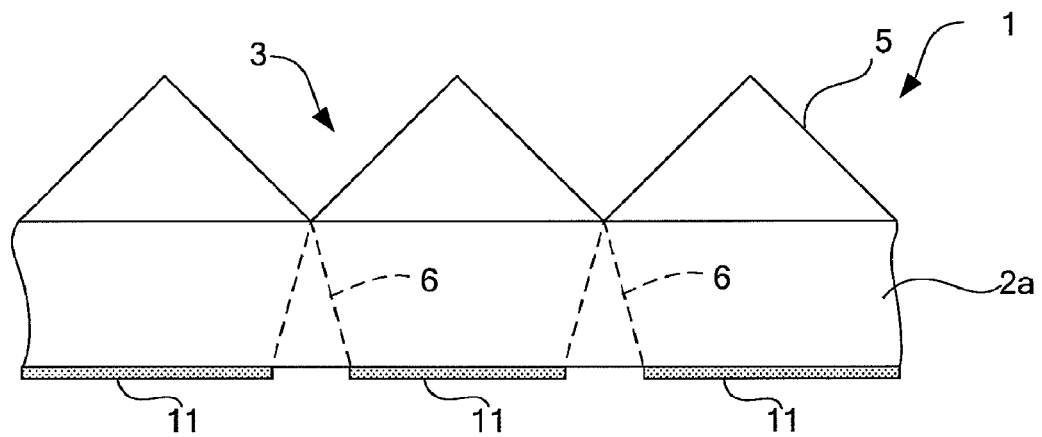
FIG. 6C is a schematic drawing illustrating a process (third step) for manufacturing the optical sheet of Example 1 of the present invention.

The non-exposed portion of the negative photosensitive layer was then washed out using the alkali liquid developer prepared in the above-described manner, and the substrate 2a having the negative photosensitive layer 11 locally on the second surface 4 was obtained, as shown in FIG. 6C.

Figure 6D:
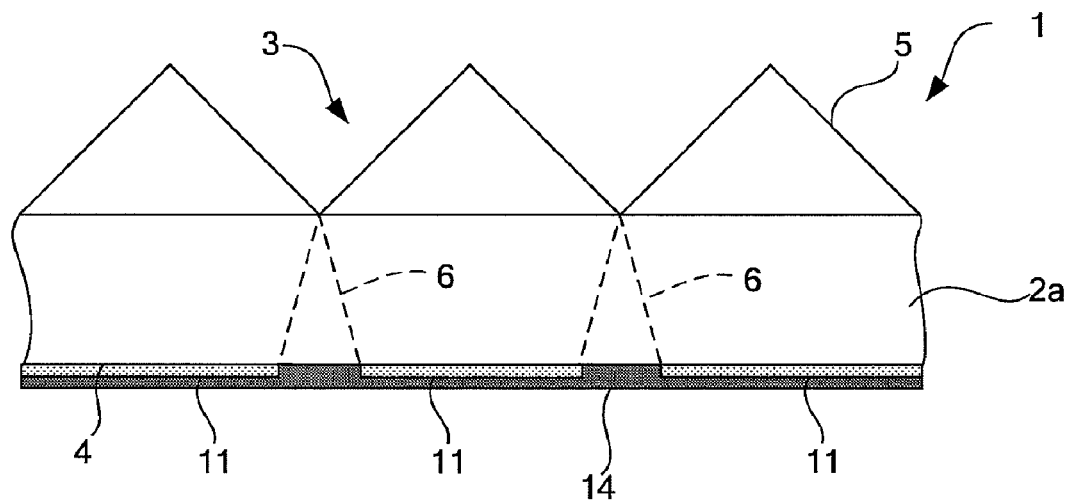
FIG. 6D is a schematic drawing illustrating a process (fourth step) for manufacturing the optical sheet of Example 1 of the present invention.
Figure 6E:
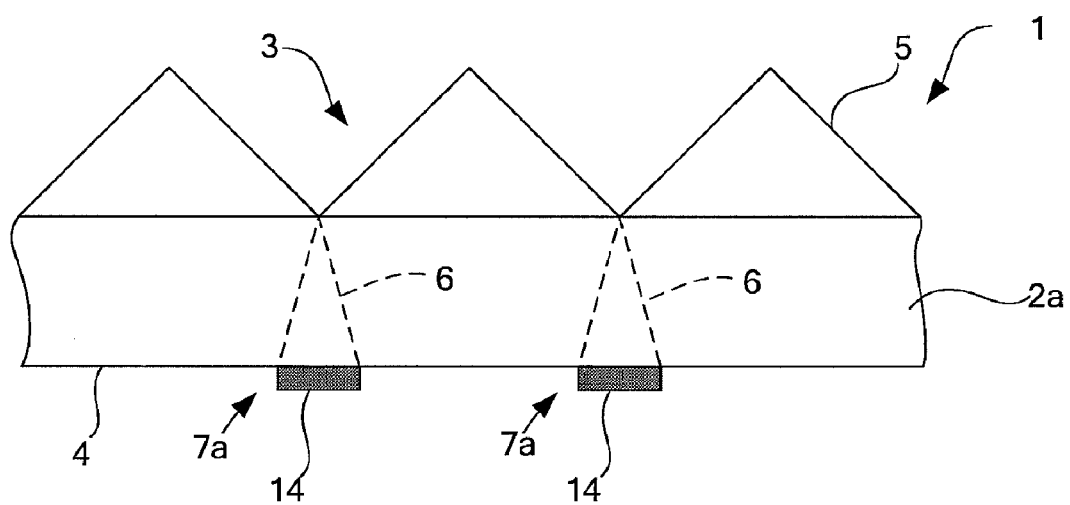
FIG. 6E is a schematic drawing illustrating a process (fifth step) for manufacturing the optical sheet of Example 1 of the present invention.

Metallic aluminum (aluminum vapor-deposited layer 12) was then vapor deposited, as shown in FIG. 6D, to a thickness of 100 nm on the second surface 4 where the negative photosensitive layer 11 has been locally formed, the negative photosensitive layer 11 was thereafter peeled off by using the alkali peeling solution prepared in the above-described manner, and the substrate 2a having the stripe-like aluminum vapor-deposited layer 12 formed on the light non-passage portion 6 was obtained, as shown in FIG. 6E. The aluminum vapor-deposited portion 12 is the first optical adjustment portion 7a and the optical reflectance thereof was 90%.

Figure 6F:
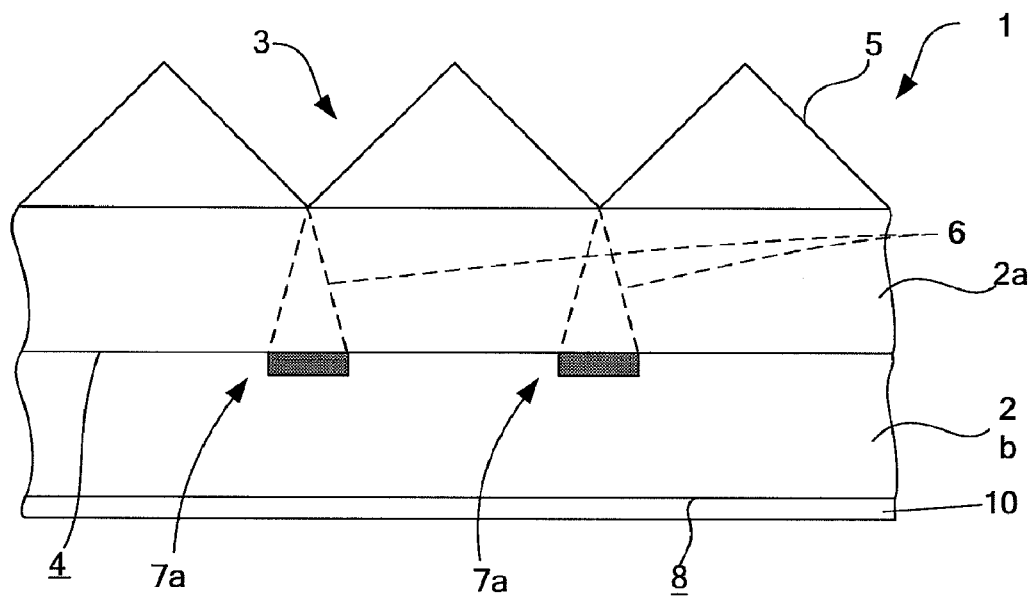
FIG. 6F is a schematic drawing illustrating a process (sixth step) for manufacturing the optical sheet of Example 1 of the present invention.

Then, as shown in FIG. 6F, the coating liquid for a prism layer that was prepared in the above-described manner was coated to a dry film thickness of 18.4 μm on the second surface 4 and dried for 1 min at a temperature of 80° C. Exposure was then performed at an exposure light dose of 1,500 mJ/cm² by using a high-pressure mercury lamp from the side of the second surface 4, the substrate layer 2b was thereby formed, the coating liquid for a negative photosensitive layer (photocurable liquid resin 10) that was prepared in the above-described manner was then coated to a dry film thickness of 0.5 μm on the front surface (third surface 8) of the substrate layer 2b and dried for 2 min at a temperature of 100° C., and the negative photosensitive layer 11 was formed on the third surface 8 of the substrate layer 2b.

Figure 6G:
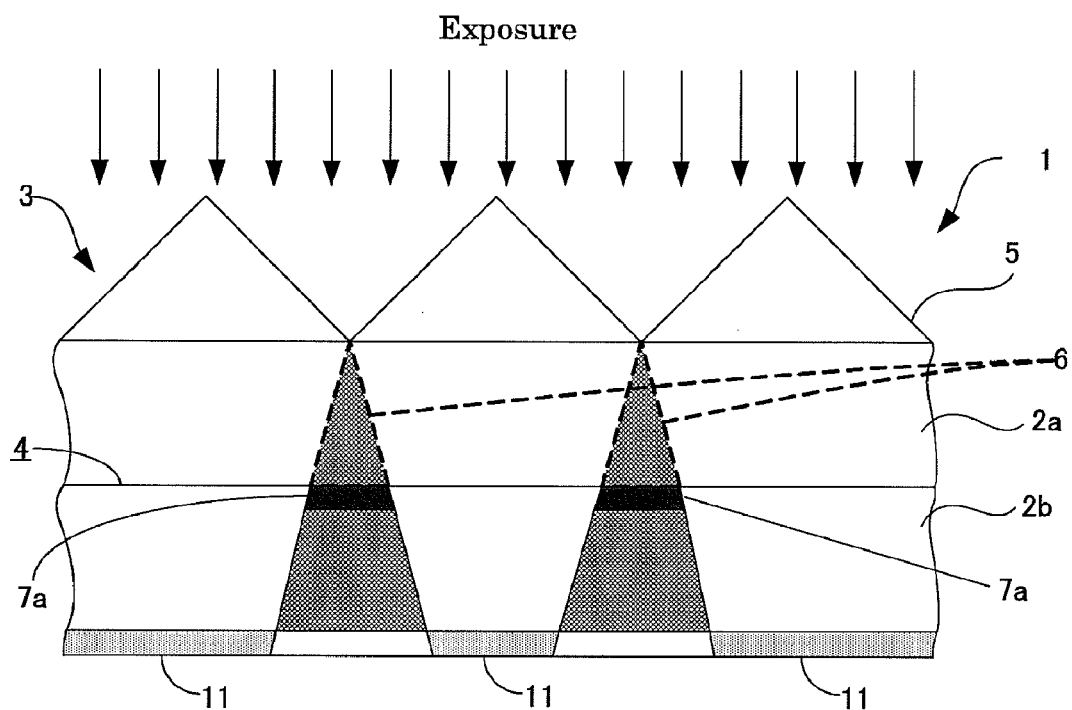
FIG. 6G is a schematic drawing illustrating a process (seventh step) for manufacturing the optical sheet of Example 1 of the present invention.

Then, as shown in FIG. 6G, a negative photosensitive layer 11 was exposed by irradiation with UV radiation parallel to the direction normal to the flat second surface 4 by using a parallel beam irradiation device (Mask Alignment Device M-2L, manufactured by Mikasa KK) from the side of the first surface 3 of the substrate 2a where the peak-valley portion 5 was formed.

Here, as shown in FIG. 6G, the hatched portion is the light non-passage portion (portion with a low light flux density) 6, and a portion of the negative photosensitive layer 11 that was not affected by the light non-passage portion 6 was cured.

Figure 6H:
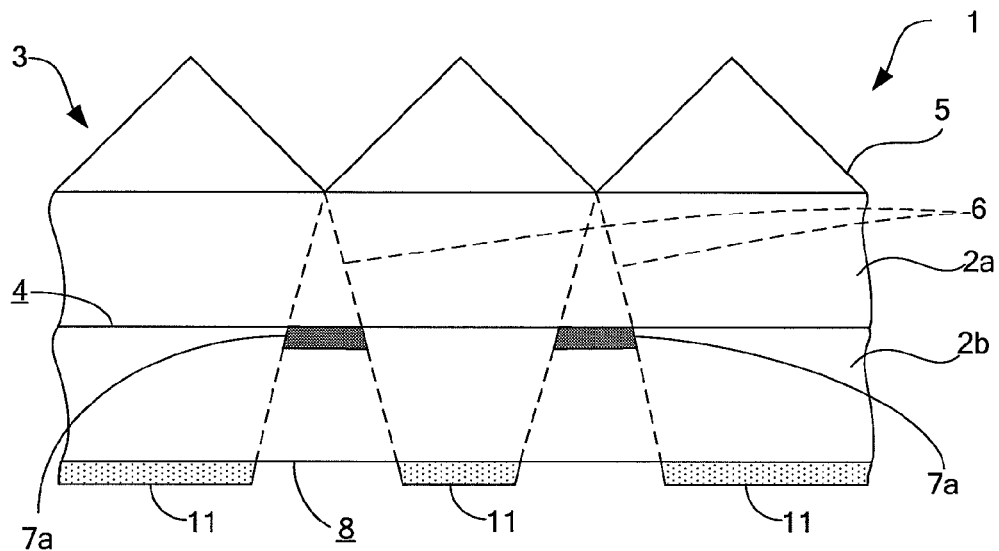
FIG. 6H is a schematic drawing illustrating a process (eighth step) for manufacturing the optical sheet of Example 1 of the present invention.

The non-exposed portion of the negative photosensitive layer 11 was then washed out using the alkali liquid developer prepared in the above-described manner, and the substrate 2b having the negative photosensitive layer 11 locally on the third surface 8 was obtained, as shown in FIG. 6H.

Figure 6I:
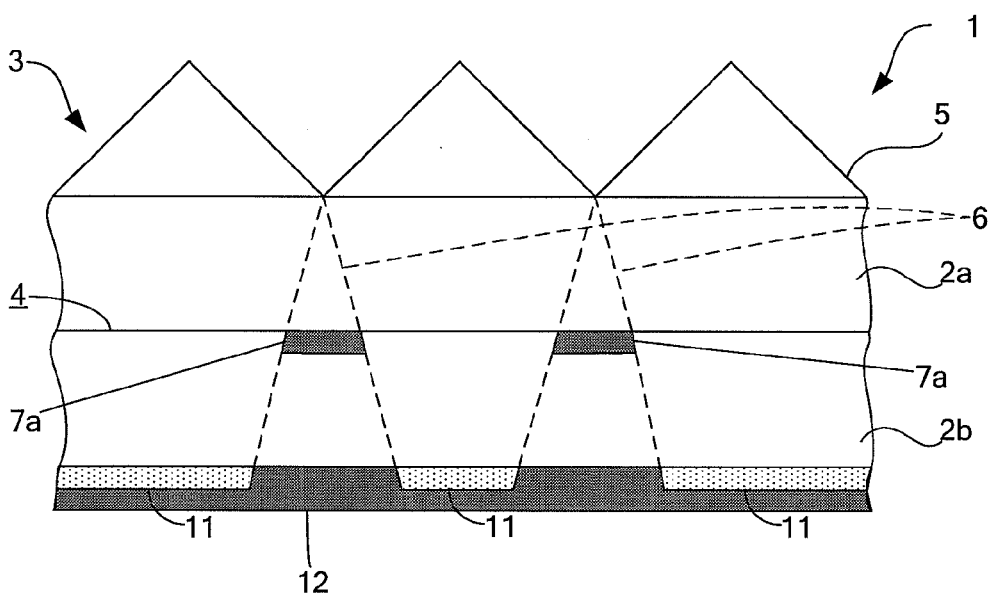
FIG. 6I is a schematic drawing illustrating a process (ninth step) for manufacturing the optical sheet of Example 1 of the present invention.
Figure 6J:
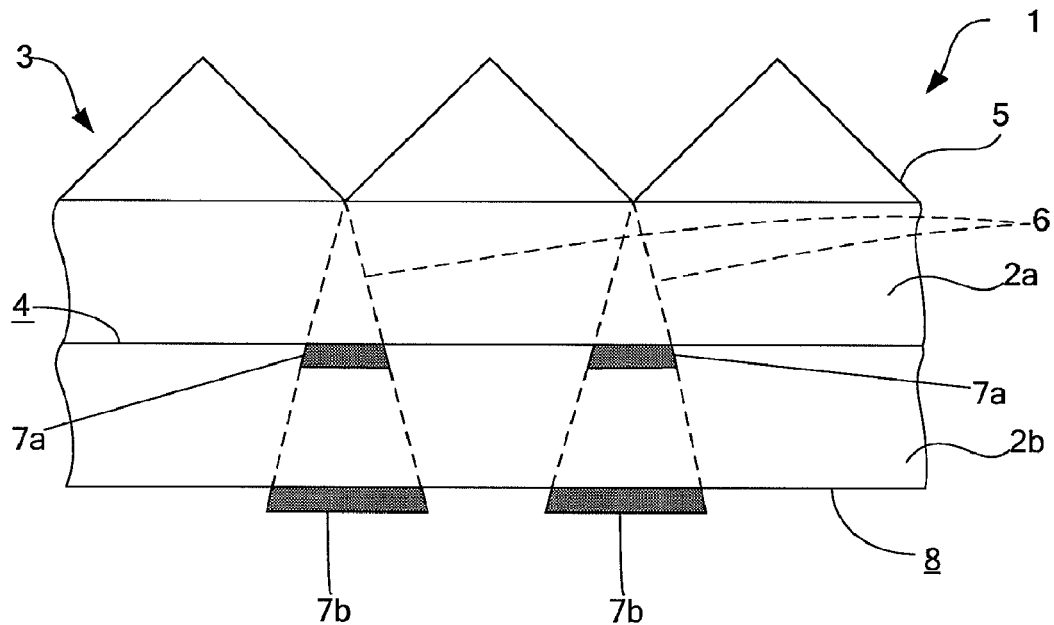
FIG. 6J is a schematic drawing illustrating a process (tenth step) for manufacturing the optical sheet of Example 1 of the present invention.

Metallic aluminum (aluminum vapor-deposited layer 12) was then vapor deposited, as shown in FIG. 6I to a thickness of 100 nm on the third surface 8 where the negative photosensitive layer 11 has been locally formed, the negative photosensitive layer 11 was thereafter peeled off by using the alkali peeling solution prepared in the above-described manner, and the substrate 2b having the stripe-like aluminum vapor-deposited layer 12 formed on the light non-passage portion 6 was obtained, as shown in FIG. 6J. The aluminum vapor-deposited portion 12 was the second optical adjustment portion 7b and the optical reflectance thereof was 90%.

Figure 6K:
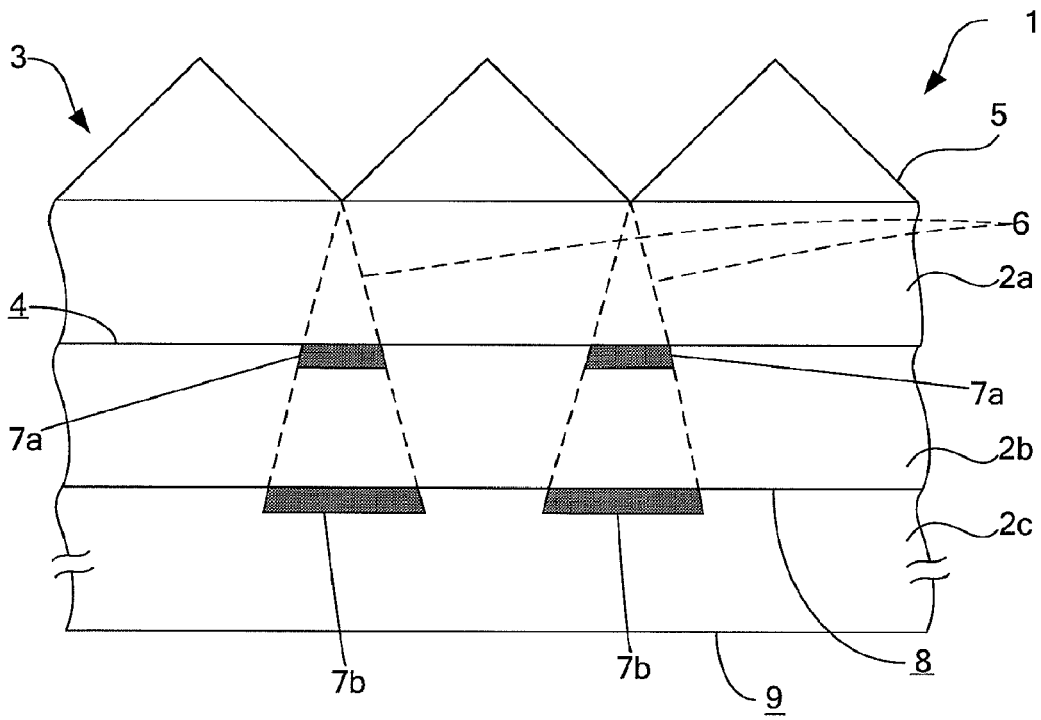
FIG. 6K is a schematic drawing illustrating a process (eleventh step) for manufacturing the optical sheet of Example 1 of the present invention.

Then, as shown in FIG. 6K, the coating liquid for a prism layer that was prepared in the above-described manner was coated to a dry film thickness of 26.1 μm on the third surface 8 and dried for 1 min at a temperature of 80° C. Exposure was then performed at 1,500 mJ/cm² by using a high-pressure mercury lamp from the side of the second surface 4, the substrate layer 2c was thereby formed again, the surface of the substrate layer 2c was formed (fourth surface 9), and the optical sheet of the present invention was fabricated. The fourth surface 9 is "the surface located opposite the first surface" in the optical sheet of the present invention. The substrate 2 is composed of the substrate 2a, substrate layer 2b, and substrate layer 2c.

Figure 6L:
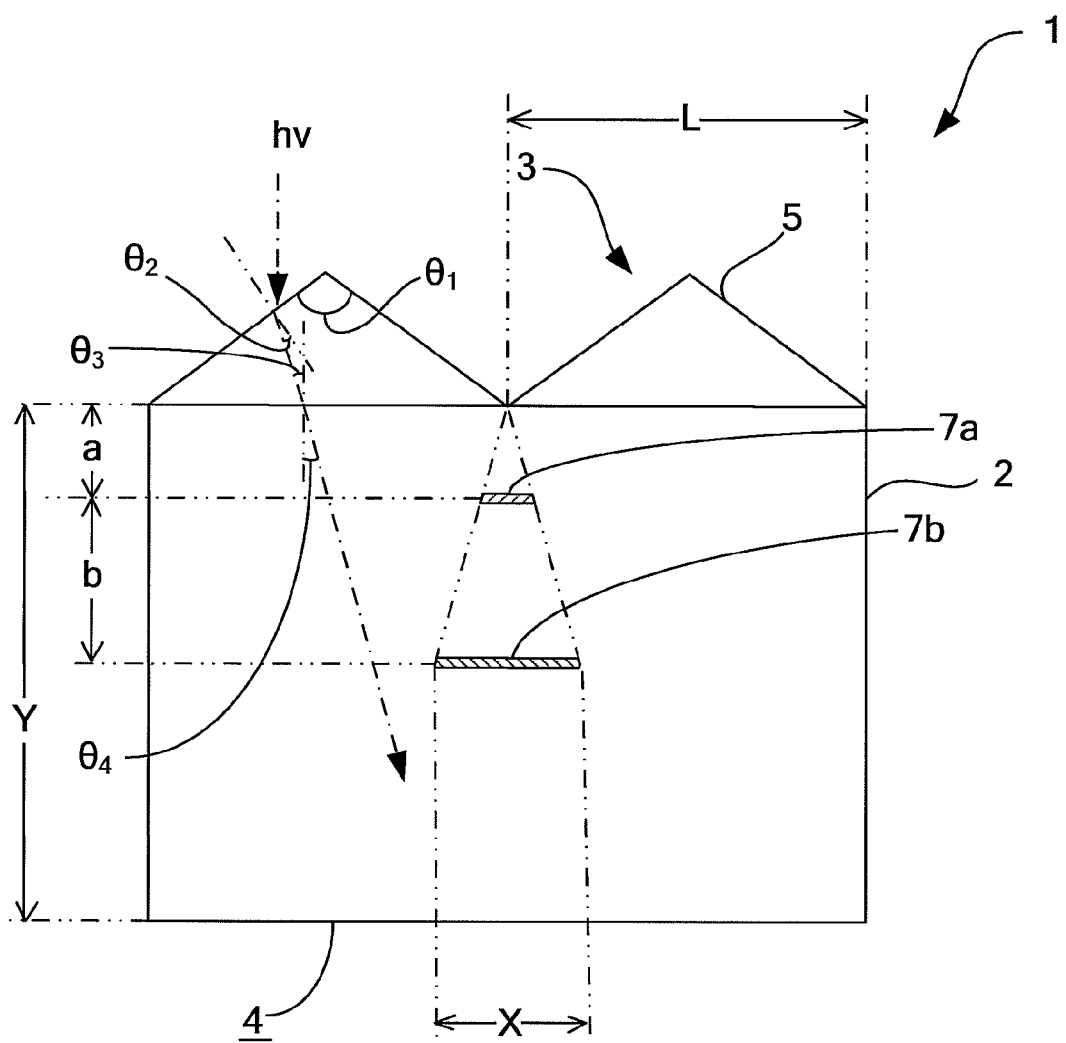
FIG. 6L is a schematic drawing illustrating a process (twelfth step) for manufacturing the optical sheet of Example 1 of the present invention.

In the optical sheet of the present invention that has been fabricated in the above-described manner, as shown in FIG. 6L, the second optical adjustment portion 7b is formed over a distance of Y/2 (=26.2 μm) from the fourth surface 9 toward the first surface in the thickness direction, where Y (=52.4 μm) is the thickness of the substrate 2, in the light non-passage portion, and the first optical adjustment portion 7a is formed over a distance of b (=18.4 μm) from the second optical adjustment portion 7b toward the first surface. The distance from the first surface of the substrate 2 to the first optical adjustment portion 7a is 7.6 μm (equal to the thickness of the prism sheet A).

<Fabrication of Display Device Having the Optical Sheet Disposed Therein>

The optical sheet (prism sheet) of Examples 1 in which a plurality of optical adjustment portions 7 having local light reflectivity were formed was disposed in a liquid crystal display panel of a liquid crystal display device. The disposition direction was set such that the first direction substantially matched the direction perpendicular to the vertically installed liquid crystal display panel.

Figure 8:
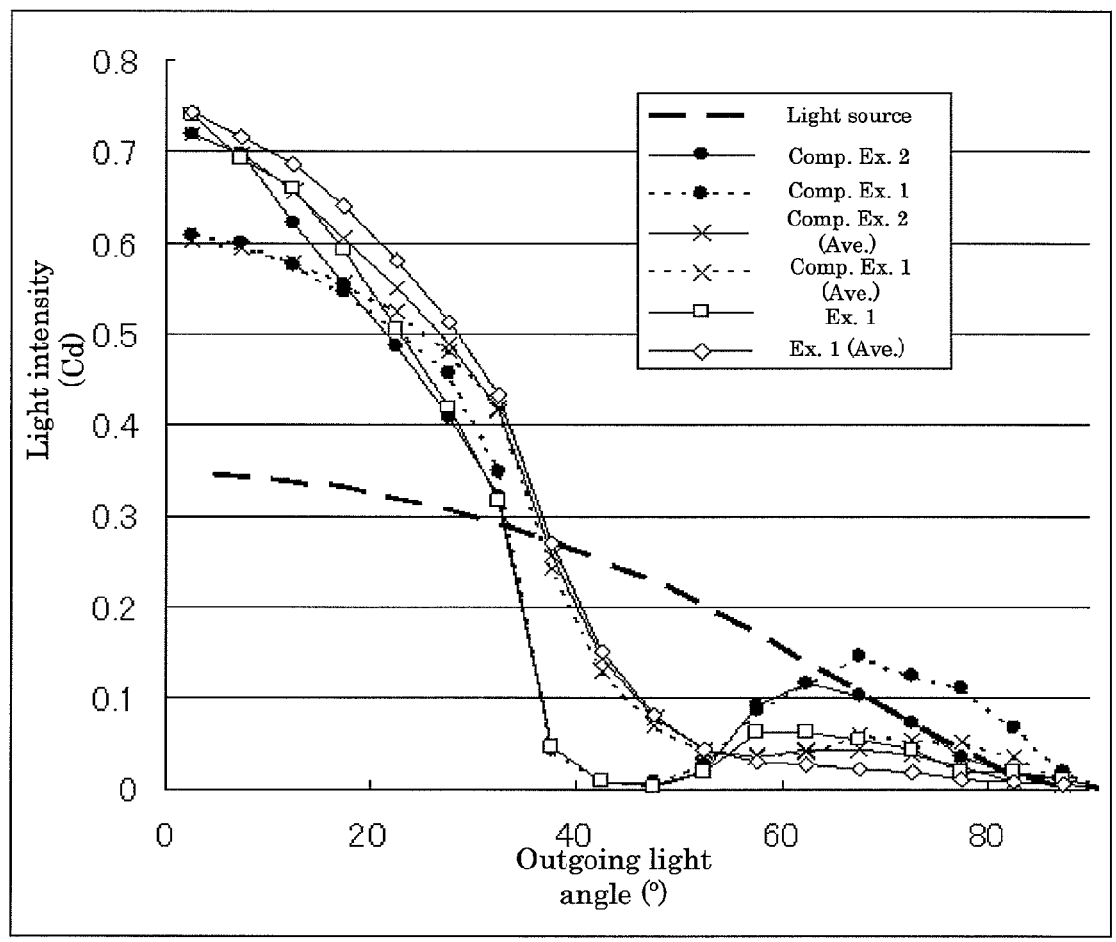
FIG. 8 is a graph illustrating angular light intensity in the direction perpendicular to edge lines of optical sheet of Example 1 of the present invention and Comparative Examples 1 and 2.
Figure 9:
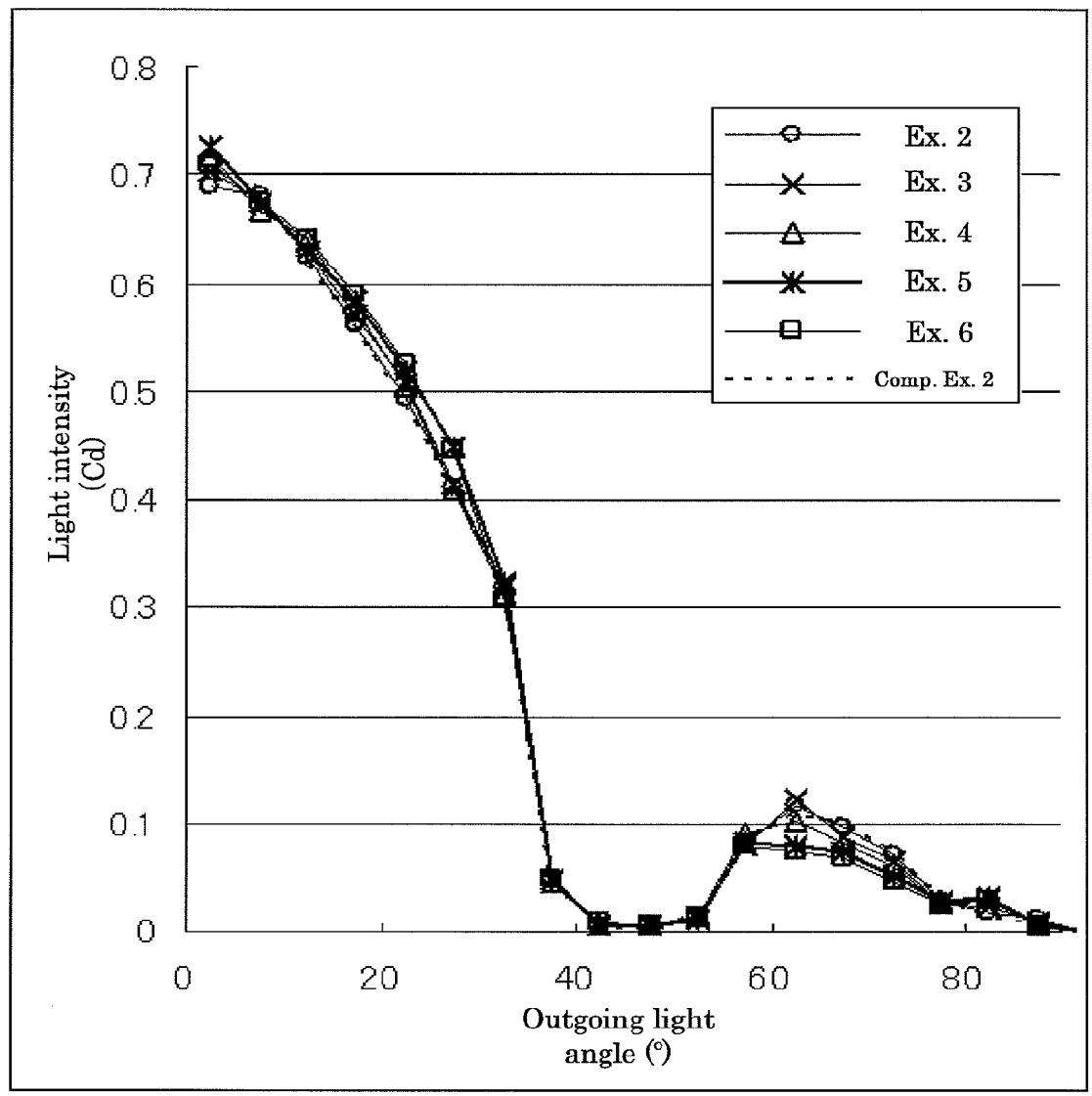
FIG. 9 is a graph illustrating angular light intensity in the direction perpendicular to edge lines of optical sheet of Examples 2 to 6 of the present invention and Comparative Example 2.
Figure 10:
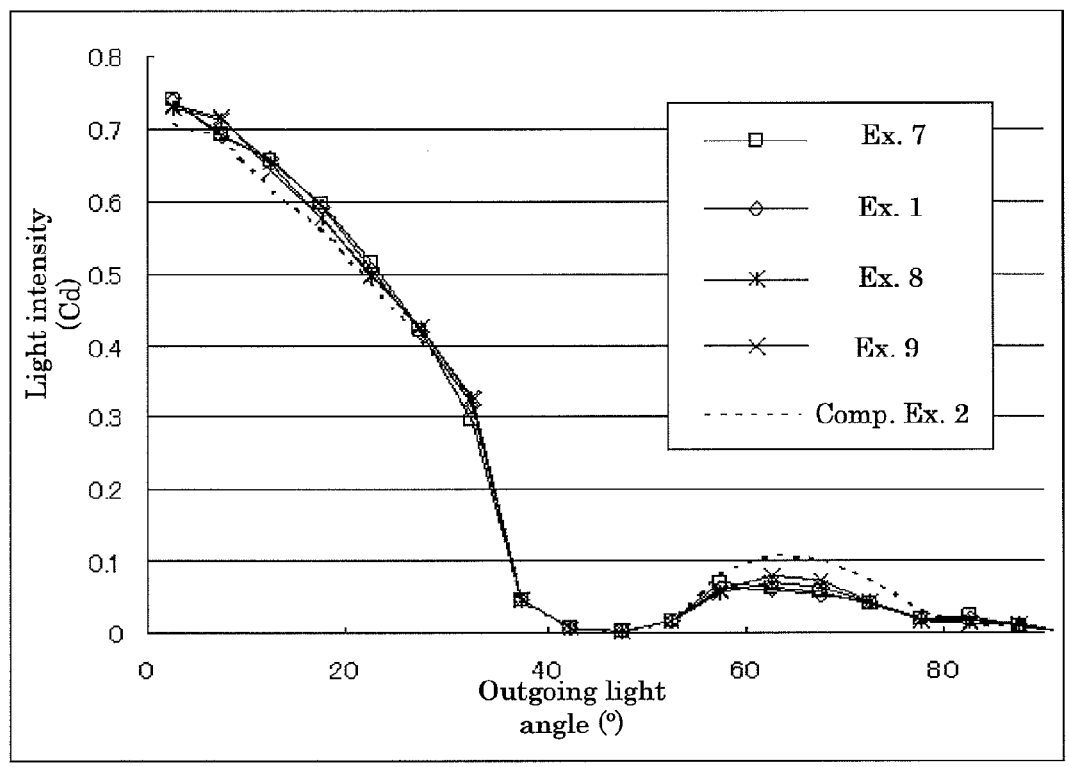
FIG. 10 is a graph illustrating angular light intensity in the direction perpendicular to edge lines of optical sheet of Examples 7 to 10 of the present invention and Comparative Example 2.
Figure 11:
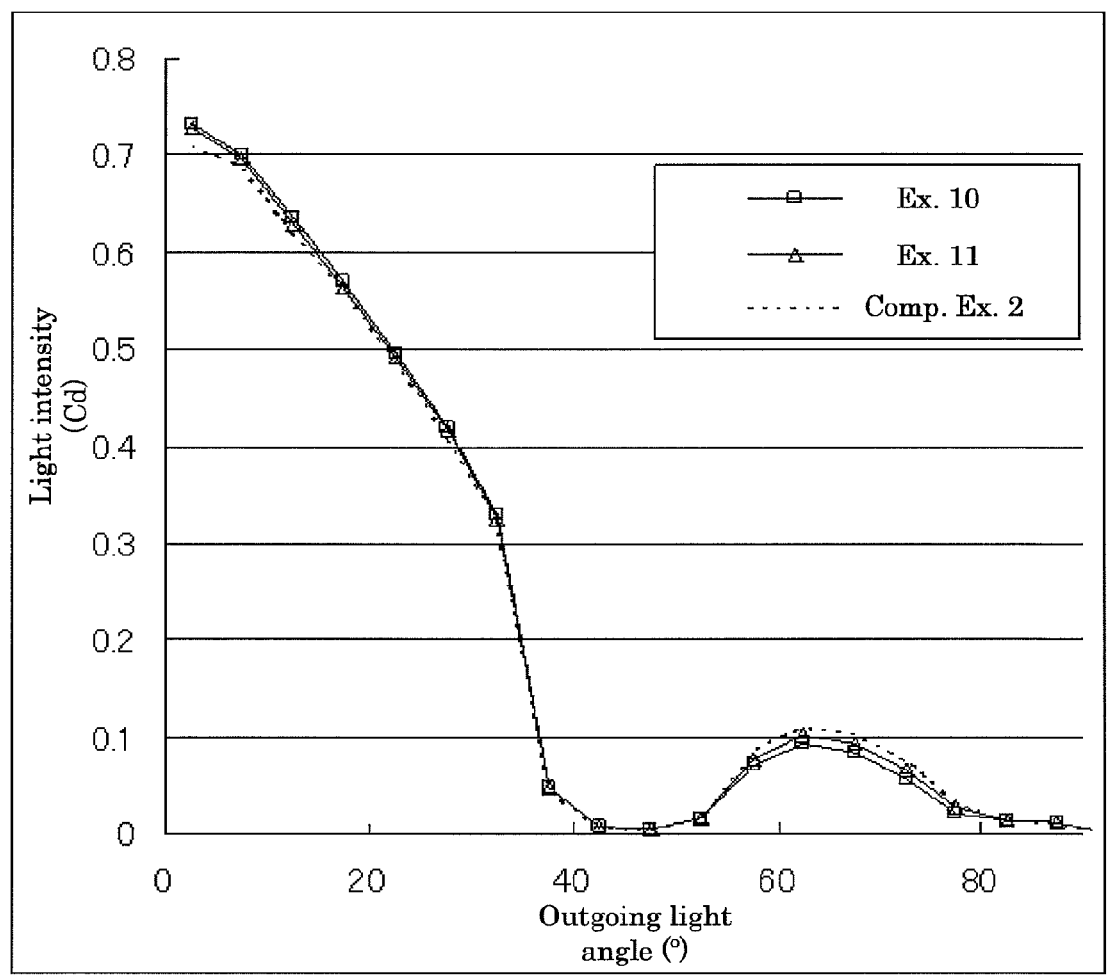
FIG. 11 is a graph illustrating angular light intensity in the direction perpendicular to edge lines of optical sheet of Examples 10 to 11 of the present invention and Comparative Example 2.
Figure 12:
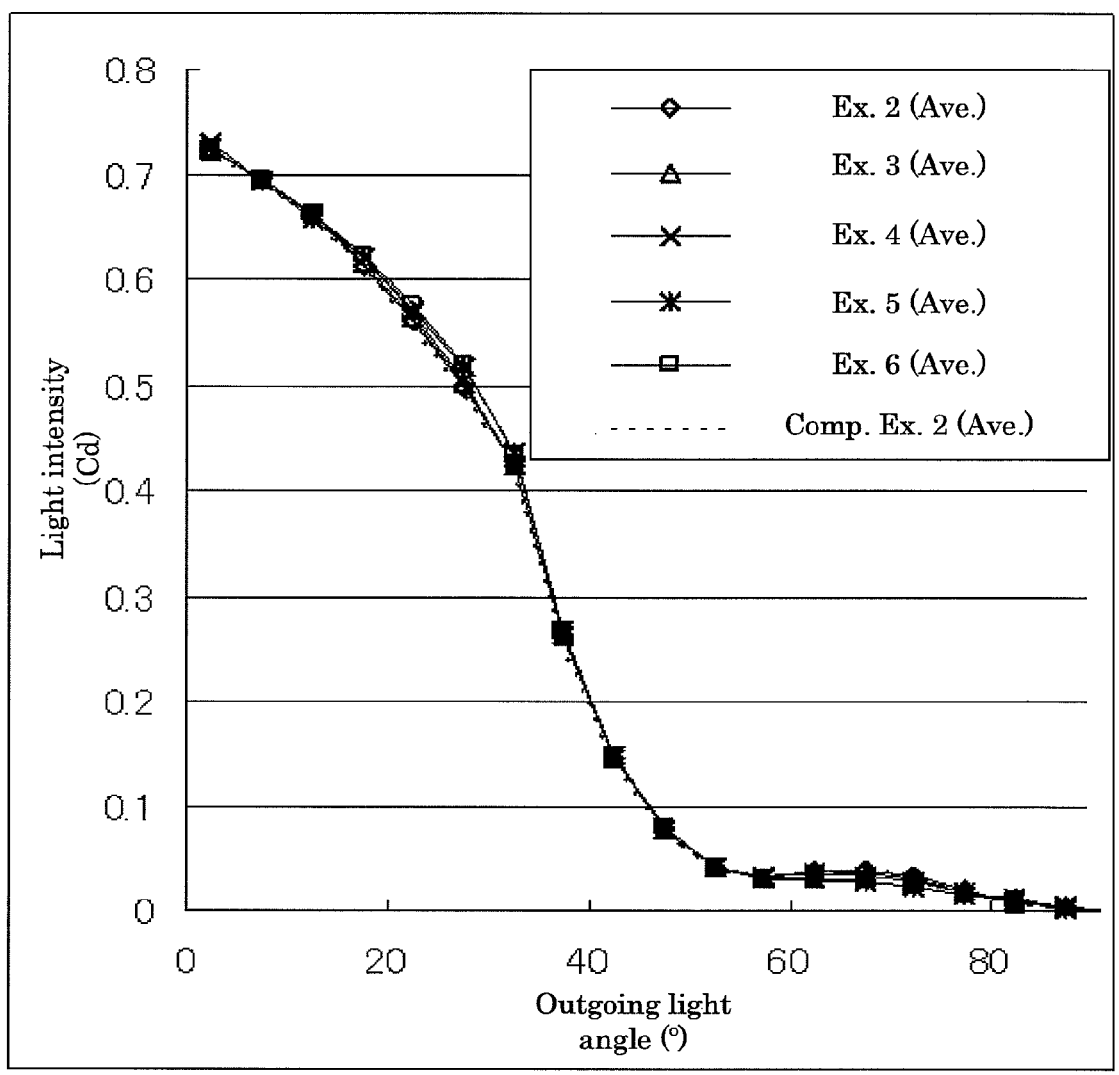
FIG. 12 is a graph illustrating angular light intensity (average) in the direction perpendicular to edge lines of optical sheet of Examples 2 to 6 of the present invention and Comparative Example 2.
Figure 13:
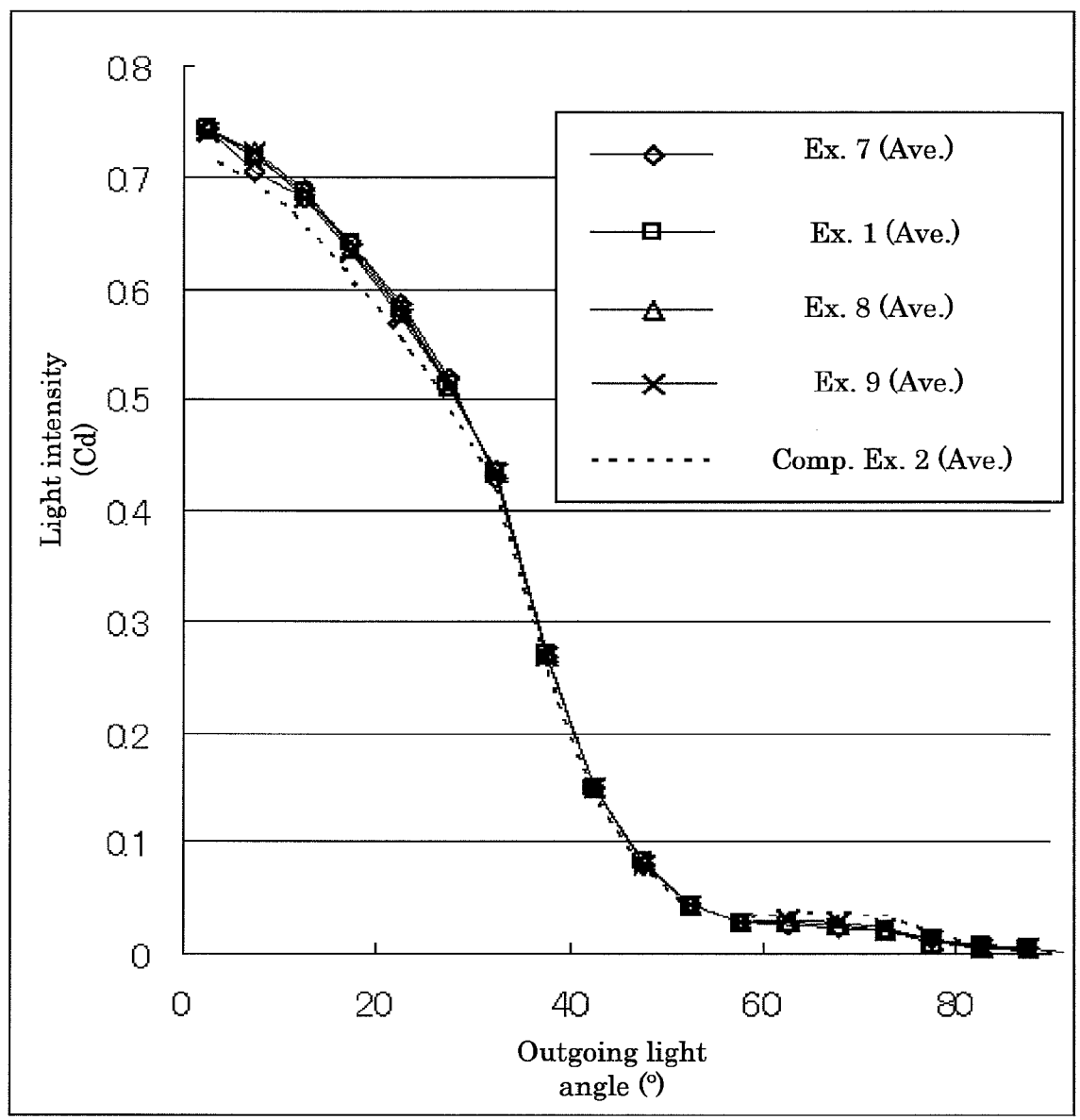
FIG. 13 is a graph illustrating angular light intensity (average) in the direction perpendicular to edge lines of optical sheet of Examples 7 to 10 of the present invention and Comparative Example 2.
Figure 14:
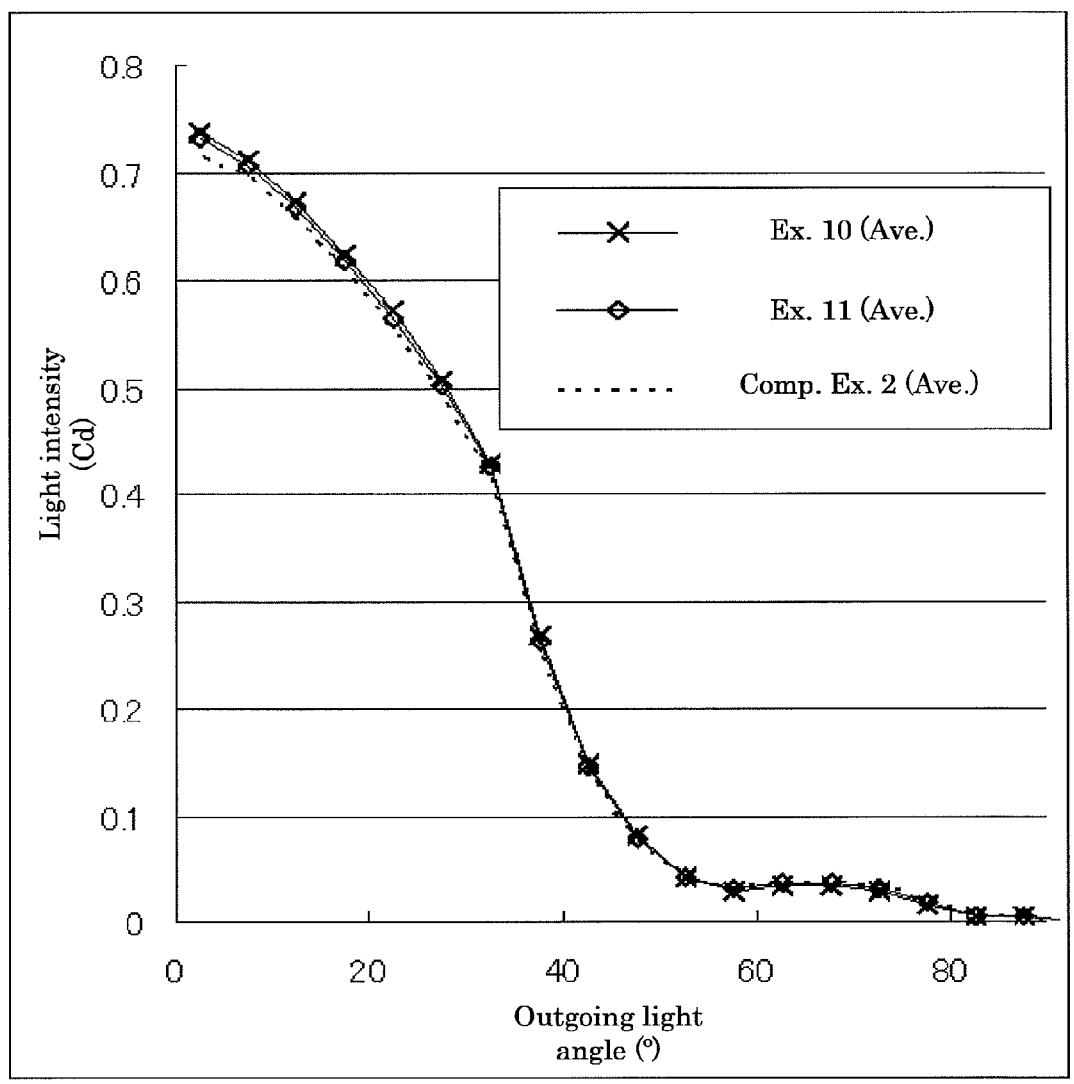
FIG. 14 is a graph illustrating angular light intensity (average) in the direction perpendicular to edge lines of optical sheet of Examples 10 to 11 of the present invention and Comparative Example 2.

FIG. 8 shows a graph obtained by measuring the angular distribution of outgoing light (distribution of light intensity (cd) vs. the angle (°) where the front surface is taken as a reference) that goes out from the optical sheet 1 in the liquid crystal display device in which the front surface is set at 0° C. and the light receiver is controlled within ±90°. The light intensity is defined by the light flux quantity (received by the light receiver) per unit solid angle. The average angular distribution of outgoing light also including the angular distribution of outgoing light in the direction perpendicular to the direction in which peaks and valleys are arranged is also shown in FIG. 8 in addition to the angular distribution of the outgoing light in the direction in which peaks and valleys are arranged. The optical sheet of Example 1 was evaluated in the below-described manner. The results are shown in Table 1.

<Evaluation of Front Surface Brightness>

The optical sheet of Example 1 was placed on a planar light source (FLR3, manufactured by Funatek KK), and the brightness was measured with a photometer/colorimeter (BM-7, manufactured by Topcon KK). Brightness evaluation was performed by using the increase ratio of the front surface brightness in the case the optical sheet was placed to the front surface brightness of the light source only, that is, without the optical sheet, that was taken as 1.

[Evaluation Criteria]

A: 1.8 or more.

B: 1.6 or more and less than 1.8.

C: less than 1.6

<Evaluation of Side Lobe Effect>

A current value in a cold cathode tube was adjusted so as to obtain a front surface brightness (light intensity received by the light receiver) in the optical sheet of Example 1 of 6,500 cd/m². The angular distribution of outgoing light that went out of the optical sheet 1 was measured in the configuration in which the front surface was set at 0° C. and the light receiver was controlled within ±90°, and the side lobe effect was evaluated based on whether the phenomenon of decrease in the light intensity close to ±45° has occurred.

In the evaluation criteria presented below, "conventional" indicates the light intensity in an optical sheet that has no "optical adjustment portion".

[Evaluation Criteria]

AA: increase in light intensity close to ±60° to 70° is less than ½ the conventional light intensity.

A: increase in light intensity close to ±60° to 70° is about ½ the conventional light intensity.

B: increase in light intensity close to ±60° to 70° is about ¾ the conventional light intensity.

C: the phenomenon of decrease in the light intensity close to ±60° to 70° has occurred (same as the conventional).

In the optical sheet of Example 1, the front surface brightness was high, the outgoing side lobe light was small, as shown in FIG. 8. As a result, the side lobe effect was eliminated and the optical sheet had properties advantageous for a display material.

Examples 2 to 11

Fabrication of Optical Sheet

Optical sheets 1 (prism sheets) of Examples 3 to 12 that had a plurality of optical adjustment portions formed therein were fabricated in the same manner as in Example 1, except that the thickness of the transparent substrate 2a manufactured from PET and subjected to a treatment facilitating adhesion on both surfaces was changed from 7.6 μm to "size a" in Table 1.

In Examples 2 to 11, the disposition depth of the second optical adjustment portion 7b in the thickness direction of the substrate 2 was the same as in Example 1, but the distance between the first optical adjustment portion 7a and the second optical adjustment portion 7b (distance in the thickness direction of the substrate 2) was made different.

<Fabrication and Evaluation of Display Device Having the Optical Sheet Disposed Therein>

The optical sheets (prism sheets) of Examples 2 to 11 were disposed in a liquid crystal display panel of a liquid crystal display device. The graphs obtained by measuring the angular distribution of the outgoing light that goes out of the optical sheet 1 are shown in FIGS. 9 to 14. The measurements and evaluation of optical sheets were performed in the same manner as in Example 1. The evaluation results are shown in Table 1.

Comparative Example 1

Fabrication of Optical Sheet

The prism sheet B fabricated in the above-described described manner was directly used as the optical sheet of Comparative Example 1.

<Fabrication and Evaluation of Display Device Having the Optical Sheet Disposed Therein>

The optical sheet (prism sheet) of Comparative Example 1 was disposed in a liquid crystal display panel of a liquid crystal display device. The graph obtained by measuring the angular distribution of the outgoing light that goes out of the optical sheet 1 is shown in FIG. 8. The measurements and evaluation of optical sheet were performed in the same manner as in Example 1. The evaluation results are shown in Table 1.

Comparative Example 2

Fabrication of Optical Sheet

Figure 7A:
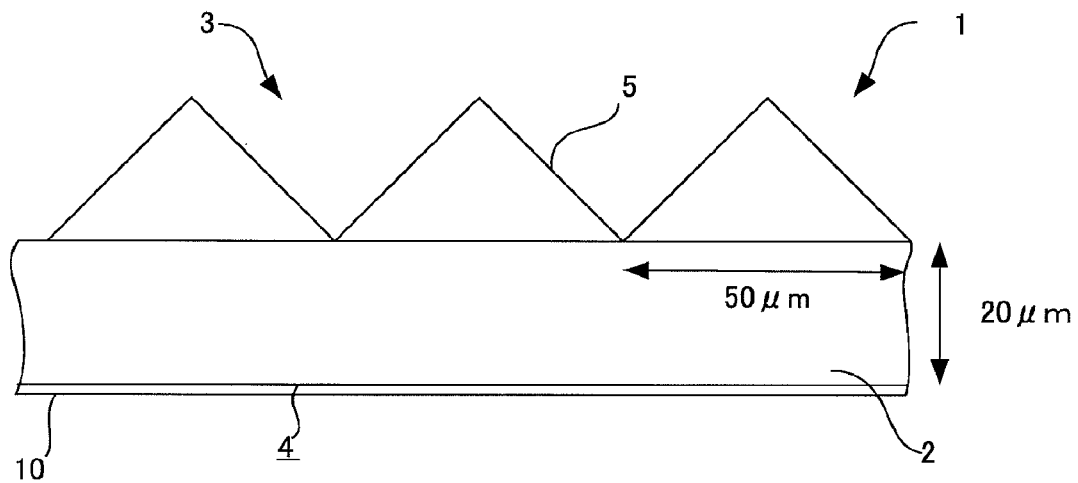
FIG. 7A is a schematic drawing illustrating a process (first step) for manufacturing the optical sheet of Comparative Example 2 of the present invention.

As shown in FIG. 7A, a coating liquid for a positive photosensitive layer that was prepared in the above-described manner was coated to a dry film thickness of 0.5 μm on the side of a flat second surface 4 (surface located opposite a first surface where a peak-valley portion 5 was formed) of a prism sheet B (substrate 2 having the peak-valley portion 5 formed thereon) in the same manner as described above, and drying was conducted for 2 min at a temperature of 100° C. to form a positive photosensitive layer 10 on the second surface 4 of the substrate 2.

Figure 7B:
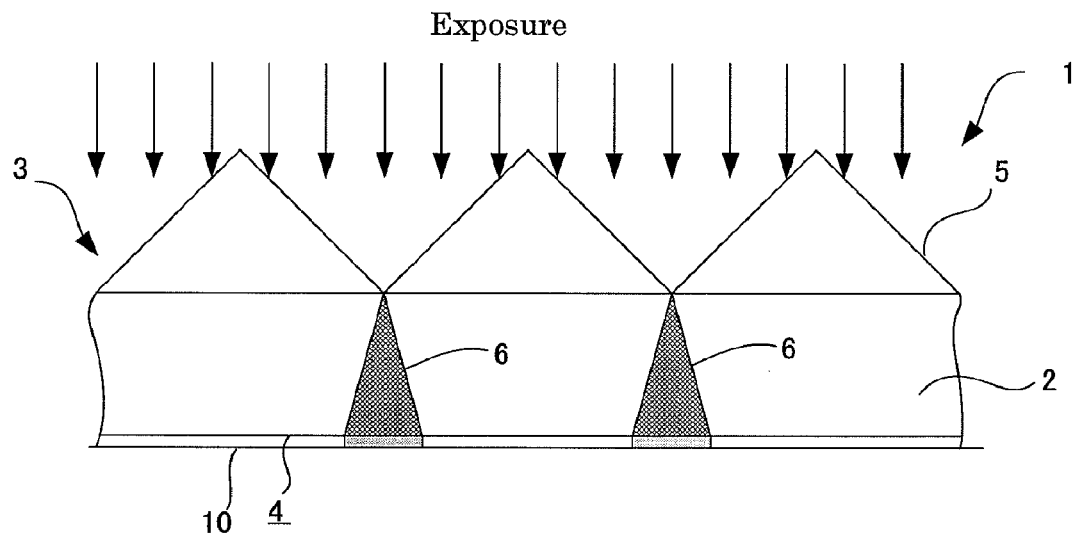
FIG. 7B is a schematic drawing illustrating a process (second step) for manufacturing the optical sheet of Comparative Example 2 of the present invention.

Then, as shown in FIG. 7B, the positive photosensitive layer was exposed by irradiation with UV radiation parallel to the direction normal to the flat second surface 4 by using a parallel beam irradiation device (Mask Alignment Device M-2L, manufactured by Mikasa KK) from the side of the first surface 3 of the substrate 2 where the peak-valley portion 5 was formed. In FIG. 7B, the hatched portion is the light non-passage portion (portion with a low light flux density) 6.

Figure 7C:
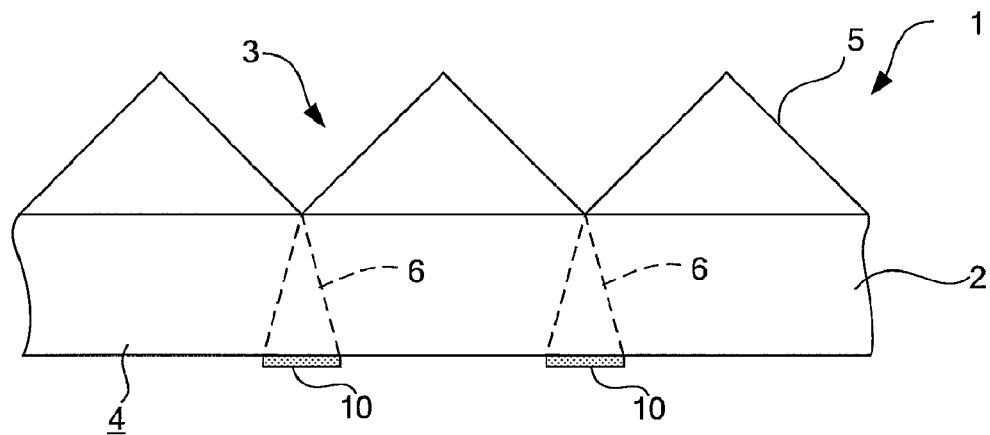
FIG. 7C is a schematic drawing illustrating a process (third step) for manufacturing the optical sheet of Comparative Example 2 of the present invention.
Figure 7D:
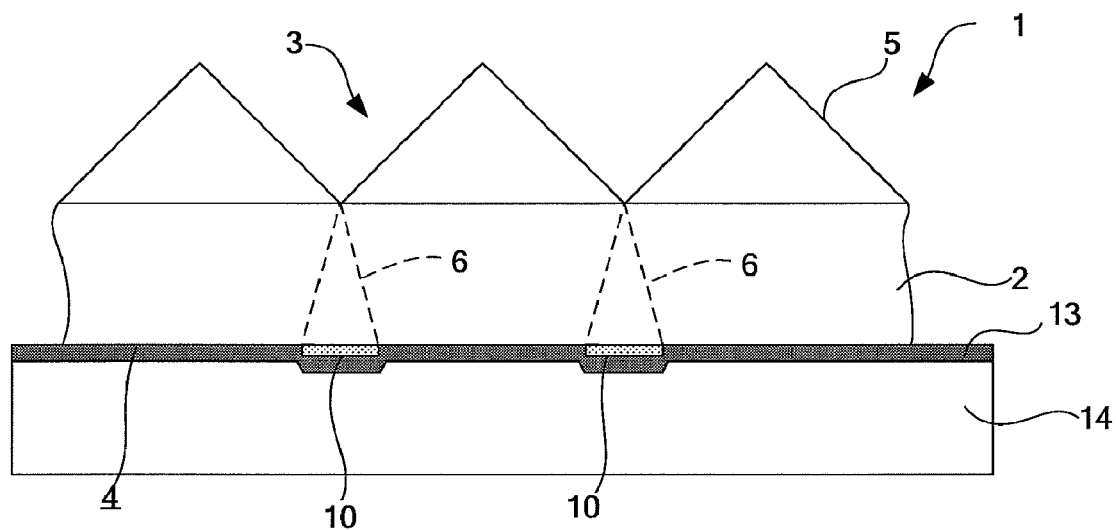
FIG. 7D is a schematic drawing illustrating a process (fourth step) for manufacturing the optical sheet of Comparative Example 2 of the present invention.
Figure 7E:
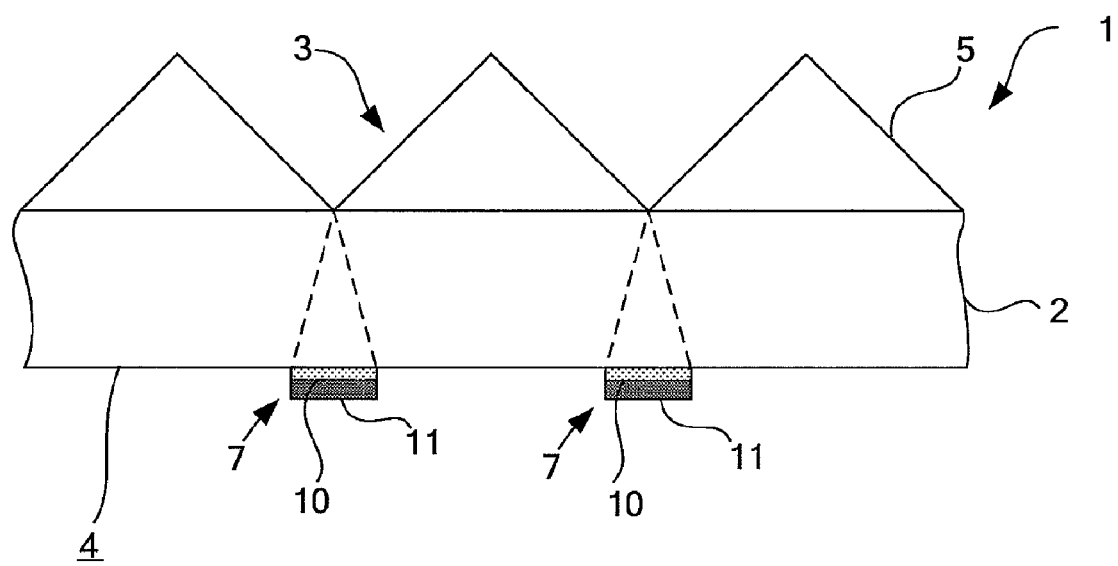
FIG. 7E is a schematic drawing illustrating a process (fifth step) for manufacturing the optical sheet of Comparative Example 2 of the present invention.

The exposed portion of the positive photosensitive layer was then washed out using the alkali liquid developer prepared in the above-described manner, and the substrate 2 having the positive photosensitive layer 10 locally in the light non-passage portion 6, this layer being the second surface 4 of the substrate 2, was obtained, as shown in FIG. 7C.

A white reflective sheet 14 provided with a white reflective layer 13 fabricated in the above-described manner was disposed at the second surface 4, where the positive photosensitive layer 10 was formed, of the substrate 2 having locally the positive photosensitive layer 10, so that the white reflective layer 13 came into contact with the second surface 4 by the positive photosensitive layer 10 having adhesivity, and thermal lamination was performed (speed 0.5 m/min, heating temperature 80° C.) in a lamination device.

The white reflective sheet 14 was then peeled off from the substrate 2, thereby producing the substrate 2 in which the white reflective layer 13 was transferred in the form of stripes onto the formation zone of the positive photosensitive layer 10. The optical sheet 1 of Comparative Example 2 was thus formed. The white layer 13 was the optical adjustment portion 7 and the optical reflectance thereof was 75%.

<Fabrication and Evaluation of Display Device Having the Optical Sheet Disposed Therein>

The optical sheet (prism sheet) of Comparative Example 2 was disposed in a liquid crystal display panel of a liquid crystal display device. The graphs obtained by measuring the angular distribution of the outgoing light that goes out of the optical sheet 1 are shown in FIGS. 9 to 14. The measurements and evaluation of optical sheet were performed in the same manner as in Example 1. The evaluation results are shown in Table 1.

viewed at an angle of about 70° from the direction normal to the prism sheet to the direction perpendicular to the prism edge light, this outgoing light being called "side lobe", was reduced to about half. Accordingly, the optical sheets of the examples had properties advantageous for display materials.

In particular, in Example 1 and Examples 7 and 8 in which the position of the second optical adjustment portion 7b referred to the position of the first optical adjustment portion 7a satisfied the condition a/b=0.3 to 0.5, the side lobe was reduced even greater, and in Example 8 in which a condition of a/b=0.3 was satisfied, the occurrence of side lobe was further reduced.

Figure 15:
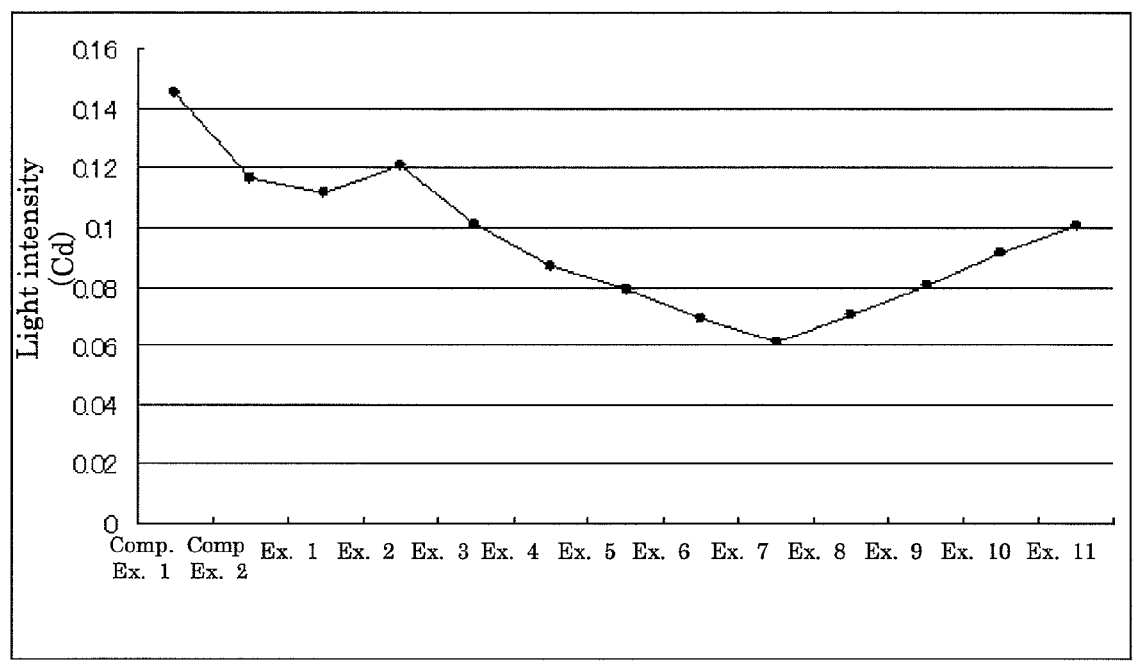
FIG. 15 is a graph illustrating the distribution of light intensity of Examples 1 to 11 and Comparative Examples 1 to 2 close to an outgoing angle of 70° in the direction perpendicular to a ridge line from substantially a central portion of the optical sheet.

FIG. 15 shows the distribution of light intensity in Examples 1 to 11 and Comparative Examples 1 and 2 in the vicinity of the outgoing angle 70° at which the effect of side lobe light can be easily confirmed. As shown in FIG. 15, the light intensity of the side lobe light in Example 1 in which the distance from the second surface to the second optical adjustment portion was 44.7 μm was especially low, and it is clear that in Example 1 in which the position of the second optical adjustment portion was thus set within the optical sheet the side lobe light reduction effect was significant.

By contrast with the examples, in the optical sheet of Comparative Example 1 in which no optical adjustment portion was formed, the quantity of outgoing light that could be viewed from an angle of about 70° from the direction normal to the prism sheet to the direction perpendicular to the prism edge light, this outgoing light being called "side lobe", was large and the front surface (direction normal to the prism sheet) brightness was low.

Further, the optical sheet of Comparative Example 2 in which only one optical adjustment portion was formed had a simple structure, the front surface (direction normal to the prism sheet) brightness thereof was higher than that of Comparative Example 1, and the side lobe at an angle of about 70° from the direction normal to the prism sheet to the direction perpendicular to the prism edge light was sufficiently sup-

TABLE 1

|  | Depth of first optical adjustment portion (μm) | Depth of second optical adjustment portion (μm) | Size a (μm) | Size b (μm) | a/b | Front surface brightness | Side lobe effect |
|---|---|---|---|---|---|---|---|
| Example 1 | 44.7 | 26.2 | 7.6 | 18.4 | 0.4 | A | AA |
| Example 2 | 27.6 | 26.2 | 24.7 | 1.3 | 19.0 | A | A |
| Example 3 | 30.7 | 26.2 | 21.6 | 4.4 | 4.9 | A | A |
| Example 4 | 33.8 | 26.2 | 18.5 | 7.5 | 2.5 | A | A |
| Example 5 | 38.4 | 26.2 | 13.9 | 12.1 | 1.1 | A | A |
| Example 6 | 40.0 | 26.2 | 12.3 | 13.7 | 0.9 | A | A |
| Example 7 | 43.1 | 26.2 | 9.2 | 16.8 | 0.5 | A | AA |
| Example 8 | 46.2 | 26.2 | 6.1 | 19.9 | 0.3 | A | AA |
| Example 9 | 47.8 | 26.2 | 4.5 | 21.5 | 0.2 | A | A |
| Example 10 | 49.3 | 26.2 | 3.0 | 23.0 | 0.1 | A | A |
| Example 11 | 50.9 | 26.2 | 1.4 | 24.6 | 0.1 | A | A |
| Comparative Example 1 | — | — | — | — | — | B | C |
| Comparative Example 2 | — | 26.2 | — | — | — | A | B |

The results shown in Table 1 demonstrate that the optical sheets (prism sheets) of Examples 1 to 11 in which a plurality of optical adjustment portions that differ in an optical property from the substrate were formed had a front surface (direction normal to the prism sheet) brightness higher by 20% than that of Comparative Example 1 and by 5% than that of Comparative Example 2, and the outgoing light that could be pressed and made suitable for practical use. However, in terms of front surface brightness and the reduction of side lobe, the effect such as was attained with the optical sheet of the present invention was not obtained.

The optical sheet of the present invention excels in a light convergence function and a light diffusion function and effectively uses the incident light that can become the side lobe light. As a result, the effect of side lobe is reduced and the optical sheet excels in the brightness increase ratio in a desirable angular direction, in particular the front surface direction. Therefore, the optical sheet of the present invention can be advantageously used in liquid crystal display devices employed in cellular phones, monitors for personal computers, television sets, and liquid crystal projections. Further, because the optical sheet especially excels in light converging ability, it can be more advantageously used as a light converging sheet with excellent brightness in the aforementioned liquid crystal display devices.

What is claimed is:

1. An optical sheet formed from a material that has substantially no visible light absorption ability, the optical sheet comprising:
   a substrate that has a first surface having formed thereon a peak-valley portion that converges and scatters light; and
   an optical adjustment portion that differs in an optical property from the substrate,
   wherein a plurality of the optical adjustment portions are formed in the thickness direction of the substrate at least in part of a non-passage portion for the light in the substrate in the case where a parallel beam falls from the first surface in a direction normal to a surface located opposite the first surface.

2. The optical sheet according to claim 1, wherein the optical property is light reflectivity.

3. The optical sheet according to claim 1, wherein the optical property is light diffusivity.

4. The optical sheet according to claim 1, wherein the optical property is a difference in refractive index.

5. The optical sheet according to claim 1, wherein the substrate is a multilayer structure comprising two or more layers.

6. The optical sheet according to claim 1, wherein the peak-valley portion is a prism structure.

7. The optical sheet according to claim 6, wherein the cross-sectional shape of the prism structure in a direction in which peak-valley portions are arranged in a row is an isosceles triangular shape with an apex angle of 60° to 120°.

8. A method for manufacturing an optical sheet formed from a material that has substantially no visible light absorption ability, the optical sheet having a substrate that has a first surface having formed thereon a peak-valley portion that converges and scatters light, and an optical adjustment portion that differs in an optical property from the substrate, a plurality of the optical adjustment portions being formed in the thickness direction of the substrate at least in part of a non-passage portion for the light in the substrate in the case where a parallel beam falls from the first surface in a direction normal to a surface located opposite the first surface, the method comprising:
   forming a photosensitive layer on a second surface of the substrate, the second surface being located opposite the first surface having formed thereon a peak-valley portion that converges and scatters light;
   exposing the photosensitive layer by irradiation with a parallel beam in the direction normal to the second surface from the first surface of the substrate;
   forming on the substrate a first optical adjustment portion that is a non-exposed portion of the photosensitive layer and differs in an optical property from the substrate;
   forming a substrate layer substantially identical in an optical property to the substrate on the second surface, and forming a photosensitive layer on a third surface that is located opposite the second surface in the substrate layer;
   exposing the photosensitive layer by irradiation with a parallel beam in the direction normal to the second surface from the first surface of the substrate; and
   forming on the substrate a second optical adjustment portion that is a non exposed portion of the photosensitive layer and differs in an optical property from the substrate.

9. The method according to claim 8, further comprising forming a substrate layer that is substantially identical in an optical property to the substrate on the third surface, and forming a second substrate comprising at least one layer on a fourth surface located opposite the third surface in the substrate layer.

10. The method according to claim 8, wherein the photosensitive layer is a positive-type photosensitive layer, the photosensitive layer of the exposed portion is removed by development, and a plurality of optical adjustment portions are formed in at least part of the photosensitive layer of the non-exposed portion.

11. The method according to claim 8, wherein the photosensitive layer is a negative-type photosensitive layer, the photosensitive layer of the non-exposed portion is removed by development, and a plurality of optical adjustment portions are formed in at least part of the removed region of the photosensitive layer.

12. The method according to claim 8, wherein the photosensitive layer is a photocurable positive-type photosensitive layer, and a plurality of optical adjustment portions are formed in at least part of the photosensitive layer of the non-exposed portion by using variation in adhesivity caused by exposure.

* * * * *